(12) United States Patent
Hofmann et al.

(10) Patent No.: US 12,487,866 B2
(45) Date of Patent: Dec. 2, 2025

(54) SYNCHRONIZED SYSTEM-ON-CHIP TELEMETRY AGGREGATION AND BUFFERING

(71) Applicant: Microsoft Technology Licensing, LLC, Redmond, WA (US)

(72) Inventors: Richard Gerard Hofmann, Cary, NC (US); Maya Subhadra, Portland, OR (US); Ajay Kesava Chandran, Beaverton, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 718 days.

(21) Appl. No.: 17/835,834

(22) Filed: Jun. 8, 2022

(65) Prior Publication Data

US 2023/0401112 A1 Dec. 14, 2023

(51) Int. Cl.
*G06F 9/46* (2006.01)
*G06F 9/52* (2006.01)

(52) U.S. Cl.
CPC ........................... *G06F 9/52* (2013.01)

(58) Field of Classification Search
CPC ............................................. G06F 9/52
See application file for complete search history.

(56) References Cited

U.S. PATENT DOCUMENTS

2016/0204992 A1 7/2016 Wu et al.
2020/0295879 A1 9/2020 Jas

OTHER PUBLICATIONS

"Arm® System Memory Management Unit Architecture Specification SMMU architecture version 3", Retrieved From: https://www.google.com/url?sa=t&rct=j&q=&esrc=s&source=web&cd=&ved=2ahUKEwjh766XzfP3AhXXUvUHHf8QBFgQFnoECAMQAQ&url=https%3A%2F%2Fdocumentation-service.arm.com%2Fstatic%2F5f901081f86e16515cdc0919%3Ftoken%3D&usg=AOvVaw1L6ieAFBDz9eiCI6JIM2md, Aug. 31, 2020, 668 Pages.
"Compute Express Link™: The Breakthrough CPU-to-Device Interconnect", Retrieved From: https://www.computeexpresslink.org/download-the-specification, Nov. 10, 2020, 4 Pages.
"DEN0094A: Arm Base System Architecture V0.9", Retrieved From: https://www.google.com/url?sa=t&rct=j&q=&esrc=s&source=web&cd=&ved=2ahUKEwiBnonR0fP3AhUMQ_UHHZpbDf8QFnoECAMQAQ&url=https%3A%2F%2Fdocumentation-service.arm.com%2Fstatic%2F5fae475aca04df4095c1c97a%3Ftoken%3D&usg=AOvVaw1r8QzJPPyW13YKztniFbvR&cshid=1653240987360794, Sep. 21, 2020, 96 Pages.
"PCI Express Base Specification Revision 5.0 Version 1.0", Retrieved From: https://pcisig.com/pci-express-base-specification-revision-50-version-10-change-bar-versions, May 22, 2019, 1299 Pages.
"International Search Report and Written Opinion Issued in PCT Application No. PCT/US23/018790", Mailed Date: Jul. 24, 2023, 12 Pages.

*Primary Examiner* — Gregory A Kessler
(74) *Attorney, Agent, or Firm* — Seed Intellectual Property Law Group LLP

(57) ABSTRACT

Embodiments of the present disclosure include techniques for synchronized telemetry aggregation and buffering in a system-on-chip (SoC). A first set of telemetry data associated with operation of a plurality of processor cores of the SoC during a first epoch is received. A second set of telemetry data associated with operation of the plurality of processor cores during a second epoch is received. The first set of telemetry data is determined as corresponding to an incomplete set of telemetry data for the first epoch. A message is transmitted to one or more controllers of the plurality of processor cores to modify operations associated with telemetry data collection as a result of the determination.

20 Claims, 12 Drawing Sheets

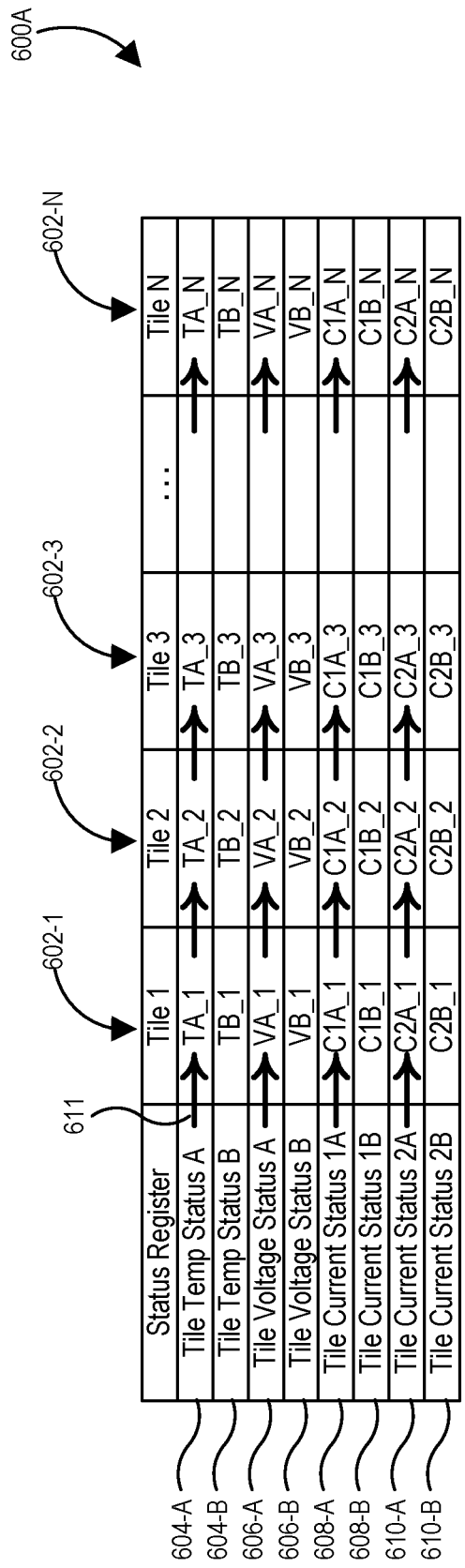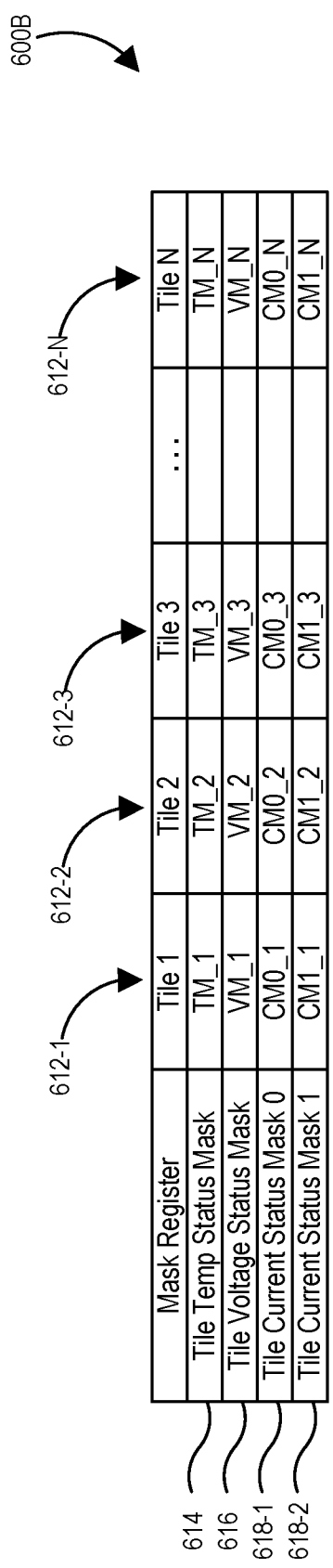

SYNCHRONIZED SYSTEM-ON-CHIP TELEMETRY AGGREGATION AND BUFFERING

BACKGROUND

The present disclosure relates to computing systems. More particularly, the present disclosure relates to techniques for aggregating and buffering telemetry data for System-on-Chips.

Some System-on-Chip (SoC) designs implement designs using a large number of processor cores. In such designs, it can be beneficial to monitor telemetry parameters of the processor cores to capture raw information for various purposes. Tracking telemetry data and timings between telemetry data sets is a difficult and complex challenge. High sampling rates used in modern SoCs can make it difficult to detect missing telemetry data or misalignment in telemetry data storage. Moreover, it can be difficult to determine which processor cores are associated with or responsible for errors associated with telemetry data.

BRIEF DESCRIPTION OF THE DRAWINGS

FIG. 6A illustrates an example status register for a plurality of tiles of the System-on-Chip architecture of FIG. 1 according to one or more embodiments.

FIG. 6B illustrates an example mask register for a plurality of tiles of the System-on-Chip architecture of FIG. 1 according to one or more embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments herein relate to techniques for synchronization of telemetry data obtained in connection with operation of a plurality of processor elements of a System-on-Chip (SoC). In SoCs with a plurality of processing elements, monitoring various telemetry parameters of the processing elements captures raw information that is useable for system management, error detection, and determination of operational heuristics, by way of non-limiting example. The present disclosure provides techniques implemented via hardware and software to produce independent streams of telemetry from the processing elements, aligns telemetry data received for a given measurement epoch, and implements one or more data structures for processing the telemetry data. Embodiments of the present disclosure also provide support for high sampling rates and handling of telemetry data for overlapping measurement epochs. Features of the present disclosure enable detection of missing data, detection of overrun conditions, and establishing a synchronized state for telemetry.

The term "epoch," as used herein, refers to a time period in which temporally related local telemetry data from all tiles or cores of a System-on-Chip architecture is received and stored by a telemetry processing engine.

Figure 1:
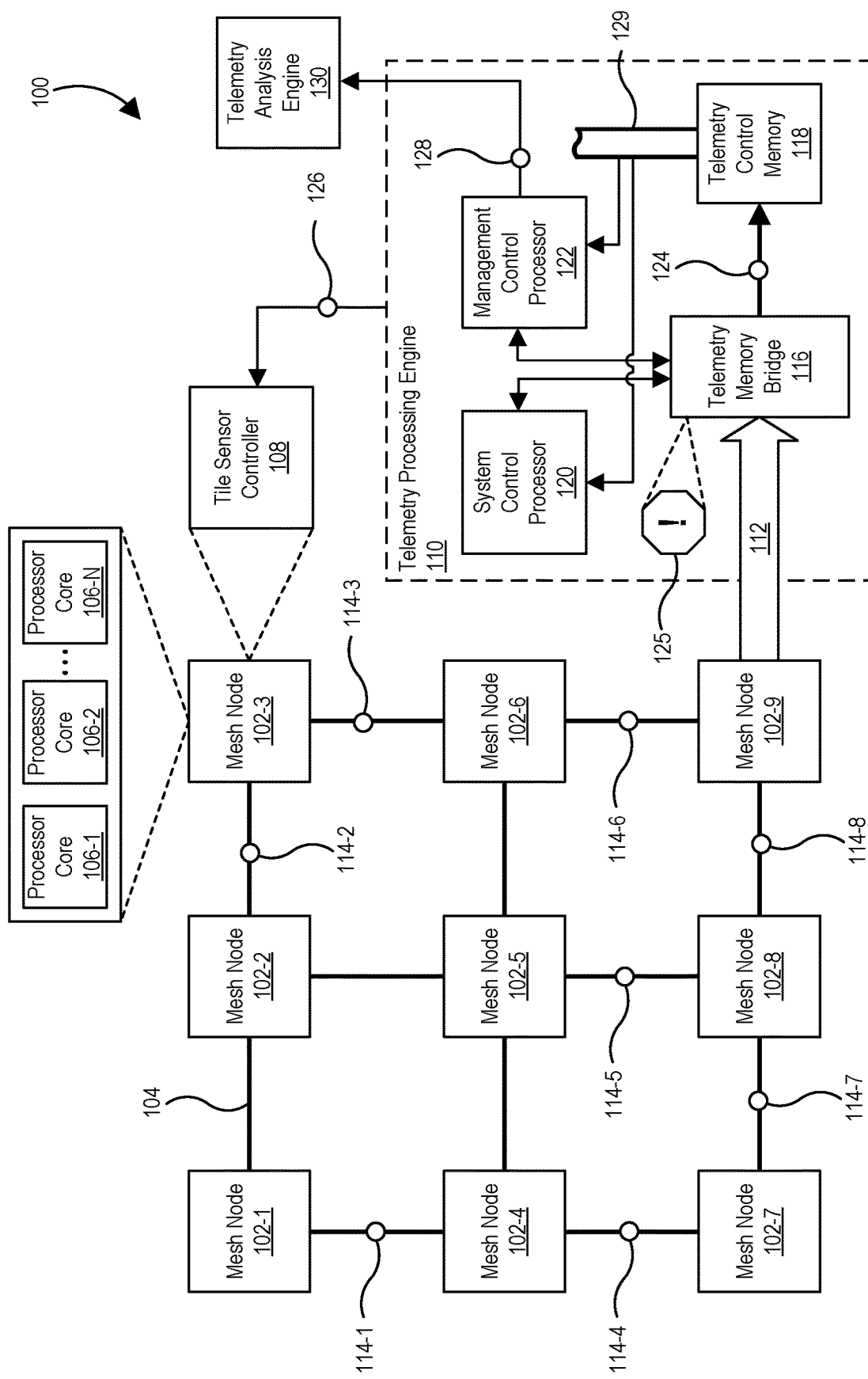
FIG. 1 illustrates an example System-on-Chip architecture according to one or more embodiments.

FIG. 1 illustrates a System-on-Chip (SoC) architecture 100 providing telemetry data aggregation and buffering according to one or more embodiments. The SoC architecture 100 includes a plurality of mesh nodes 102-1, 102-2, ... 102-N (collectively "mesh nodes 102") and a plurality of channels 104 for conveying telemetry data between adjacent nodes of the mesh nodes 102. Each of the mesh nodes 102 is associated with a set of processor cores or processing elements 106-1, 106-2, ... 106-N (collectively "processor cores 106") for which telemetry data is collected. For instance, a set of processor cores 106 associated with the mesh node 102-1 is mutually exclusive of a set of processor cores 106 associated with the mesh node 102-2.

The SoC architecture 100 also includes a plurality of tile sensor controllers 108 that are each associated with an individual node of the mesh nodes 102. Each tile sensor controller 108 may be associated with and process telemetry data for the set of processor cores 106 of a single node of the mesh nodes 102. Each tile sensor controller 108 receives measurements for one or more telemetry parameters (e.g., temperature, voltage, current) of the associated node and its processor cores 106, generates telemetry data based on the measurements received, and provisions the telemetry data to the associated mesh node 102 and its processor cores 106. In some embodiments, the tile sensor controller 108 may control or initiate adjustments that affect the telemetry parameters. For instance, the tile sensor controller 108 may adjust the current, clock frequency, or voltage applied to a processor core 106 in response to determining that a temperature, current, or voltage of the processor core 106 exceeds a defined threshold. The term "tile," as used herein, refers to a collection of one or more processor cores, telemetry data sampling devices, and a telemetry data router that are associated with a single mesh node of the mesh nodes 102. Further description of a tile is described with respect to FIG. 3 and elsewhere herein.

The SoC architecture 100 further includes a telemetry processing engine 110 that receives telemetry data 112 comprising telemetry data 114 collected by some or all of the mesh nodes 102 for a given epoch. A subset of the mesh nodes 102 receive telemetry data 114 from one or more mesh nodes and propagate the telemetry data received to other mesh nodes along with their own telemetry data. The telemetry processing engine 110 receives the telemetry data 112 from a designated node of the mesh nodes 102 as a result of the telemetry data 114 being propagated through the mesh nodes 102. The mesh node 102-9 is a node that is assigned, from among the plurality of mesh nodes 102, to provide the telemetry data 112 to the telemetry processing engine 110.

The mesh nodes 102 may communicate with each other via the channels 104 to determine how telemetry data is propagated through mesh nodes 102. For a given epoch, a set of adjacent nodes may be designated from which an individual node of the mesh nodes 102 will receive telemetry data 114. Another adjacent node is designated to which the individual node will send their telemetry data 114 along with the telemetry data received from the set of adjacent nodes for the given epoch. The telemetry data 114 generated for each mesh node 102 includes sensor data indicating measured temperature, voltage, and/or current associated with the set of associated processor cores 106. The telemetry data 114 generated for each mesh node 102 includes, in some embodiments, performance data indicating a performance level at which the associated set of processor cores 106 can operate and/or includes consumption data indicating a power consumption level of the associated set of processor cores 106.

As a specific non-limiting example, the mesh node 102-1 generates telemetry data 114-1 for its set of processor cores 106 and sends the telemetry data 114-1 to the adjacent mesh node 102-4. The mesh node 102-4 also generates telemetry data 114-4 for its associated set of processor cores 106 and sends the telemetry data 114-4 to the adjacent mesh node 102-7. The mesh node 102-4 may also send the telemetry data 114-1 received from the mesh node 102-1 to the mesh node 102-7. The mesh node 102-7 generates telemetry data 114-7 for its associated set of processor cores 106 and sends the telemetry data 114-7 to the adjacent mesh node 102-8. The mesh node 102-7 may also send the telemetry data 114-4 and/or the telemetry data 114-1 received from the mesh node 102-4 to the adjacent mesh node 102-8. The mesh node 102-8 generates telemetry data 114-8 for its associated set of processor cores 106 and sends the telemetry data 114-8 to the mesh node 102-9. The mesh node 102-8 may also send telemetry data 114-1, 114-4, 114-7, and/or 114-8 received from the adjacent mesh nodes 102-7 and 102-5 to the mesh node 102-9. The mesh node 102-9 may also receive telemetry data 114-2 generated by the mesh node 102-2, telemetry data 114-3 generated by the mesh node 102-3, and/or telemetry data 114-6 generated by the mesh node 102-6 from the adjacent mesh node 102-6. The mesh node 102-6 sends the telemetry data 114-2, 114-3, and/or 114-6 to the mesh node 102-9.

The telemetry data 114 generated for the mesh nodes 102 may be received and sent by the mesh node 102-9 to the telemetry processing engine 110 at different times. Therefore, the telemetry data 112 may comprise a series of telemetry data 114 that may arrive at the mesh node 102-9 in random order. The introduction of mesh network traffic on the channels 104 other than the telemetry data 114 can cause further variations in times at which telemetry data 112 is received by the telemetry processing engine 110.

The telemetry processing engine 110 includes a telemetry memory bridge 116 that receives the telemetry data 112 and telemetry control memory 118 for storing the telemetry data 112. The telemetry processing engine 110 also includes a system control processor 120 communicatively coupled to the telemetry memory bridge 116 and the telemetry control memory 118. The system control processor 120 is configured to manage power applied to and/or consumed by the processor cores 106 and other aspects of the mesh nodes 102. The system control processor 120 is also responsible for controlling various aspects of sensors and telemetry capturing devices, such as synchronization, sensor setup, sensor error handling, firmware updates, and telemetry gathering. The telemetry processing engine 110 may include a management control processor 122 communicatively coupled to the telemetry memory bridge 116 and the telemetry control memory 118.

The telemetry memory bridge 116 includes logic (e.g., programmable logic, hardwired logic) that causes the telemetry memory bridge 116 to perform as described herein. The telemetry memory bridge 116 is configured to parse the telemetry data 112, track the status of the telemetry data 114 included in the telemetry data 112 for individual epochs, and store parsed telemetry data 124 in the telemetry control memory 118. The telemetry memory bridge 116 is also configured to manage data objects associated with the telemetry data 114 and perform error handling related to the telemetry data 114. The telemetry data bridge 116 is configured to generate an error status 125 based on the parsed telemetry data 124. Generation of the error status 125 may include generating an interrupt, a control signal, a message, or modification of a status register, by way of non-limiting example.

The telemetry control memory 118 comprises volatile memory (e.g., Random Access Memory) that includes a set of data structures for storing the parsed telemetry data 124. The telemetry control memory 118, more specifically, includes a set of circular buffers that store the parsed telemetry data 114. In some embodiments, the set of circular buffers includes a different circular buffer for each type of telemetry data. For instance, a first circular buffer may be configured to store temperature data, a second circular buffer may be configured to store voltage data, and a third circular buffer may be configured to stored current data. In some embodiments, the circular buffers may have different attributes specific to the type of telemetry data. One circular buffer, for instance, may be a different size than another circular buffer. One circular buffer may be configured to store an array of entries for a given processor core whereas another circular buffer may be configured to store a single entry for the same processor core. In some embodiments, the telemetry control memory 118 is an error correction coded memory macro operating at a defined frequency (e.g., 600 MHz, 800 MHz).

In some embodiments, the telemetry control memory 118 includes a plurality of ports through which memory locations in the telemetry control memory 118 may be accessed. The plurality of ports of the telemetry memory bridge 116 may include a first set of ports through which the telemetry memory bridge 116 may access the telemetry control memory 118. The plurality of ports of the telemetry memory bridge 116 may include a second set of ports through which the system control processor 120 and/or the management control processor 122 may access the telemetry control memory 118. The telemetry processing engine 110 may include an interconnect system 129, such as a utility bus, coupled to the to the second set of ports and the system control processor 120 and/or the management control processor 122. The system control processor 120 and/or the management control processor 122 may read telemetry data stored in the telemetry control memory 118 via the interconnect system 129. The telemetry memory bridge 116 may write telemetry data to the telemetry control memory 118 via the first set of ports while the system control processor 120 and/or the management control processor 122 are reading telemetry data from the telemetry control memory 118 via the second set of ports. In some embodiments, the system control processor 120 and the management control processor 122 may access the telemetry control memory 118 via the same port or ports of the second set of ports.

The system control processor 120 is configured to track the status of telemetry data 114 received and handle errors associated with the telemetry data 114. The system control processor 120 may send messages or interrupts to the tile sensor controller 108 to remediate errors detected. The system control processor 120 may also send messages 126 (e.g., control signals, interrupts, instructions) to the tile sensor controller 108 to adjust various telemetry parameters based on the telemetry data 114 received. The management control processor 122 may manage pointers for the circular buffers and track the parsed telemetry data 124 that has been stored to the telemetry control memory 118. The management control processor 122 may be coupled to the telemetry control memory 118 (e.g., via a utility bus) and access telemetry data stored therein based on pointers in the telemetry memory bridge 116.

In some embodiments, the message 126 may include a sensor trigger signal that may cause tile sensor controllers 108 for one or more of the mesh nodes 102 to transition between a first mode in which telemetry data collection is enabled and a second mode in which telemetry data collection is disabled. In some embodiments, the sensor trigger signal may be specific to a type of telemetry data. For instance, the message 126 may include a first trigger message associated with enabling/disabling temperature telemetry data collection, a second trigger message associated with enabling/disabling voltage telemetry data collection, and a third trigger message associated with enabling/disabling current telemetry data collection. Further description of the sensor trigger is described with respect to FIG. 2 and elsewhere herein.

Each of the mesh nodes 102 is a cross-point or router that supports connection of two or more channels 104. In some embodiments, the mesh nodes 102 may have a two-dimensional arrangement comprising rows and/or columns. In some embodiments, the two-dimensional arrangement of the mesh nodes 102 may be a lattice structure in which vertically adjacent and horizontally adjacent nodes are spaced apart at an equal distance. The mesh nodes 102 may, in some embodiments, be arranged along a single dimension or arranged in geometric pattern. The mesh nodes 102 may include one or more types of nodes, such as coherent nodes, non-coherent nodes, home nodes, subordinate nodes, request nodes, and miscellaneous nodes, by way of non-limiting example.

Each of the channels 104 may include one or more communication channels or subchannels connecting adjacent nodes. In embodiments where individual channels 104 include a plurality of subchannels, each of the channels 104 may include different types of communication subchannels, such as request channels, response channels, data channels, and snoop channels, by way of non-limiting example. The mesh nodes 102 and the channels 104 may comprise a coherent mesh network for facilitating communications and conveying data among the mesh nodes 102. The mesh nodes 102 may communicate and/or convey data according to one or more appropriate communication protocols, such as the Coherent Hub Interface (CHI) protocol or the AXI4-Stream protocol. In some embodiments, the channels are at least part of a processor utility bus, such as an advanced microcontroller bus that utilizes an advanced extensible interface bus protocol.

In some embodiments, the SoC architecture 100 may include a telemetry analysis engine 130 that includes one or more control processors for analyzing the telemetry data. The management control processor 122 reads the telemetry data 124 stored in a set of buffers in the telemetry control memory 118, as described with respect to FIGS. 5A through 5C infra. The management control processor 122 may send telemetry data 128 read to the telemetry analysis engine 130. The telemetry analysis engine 130 may control operational characteristics of the processor cores 106 based on the telemetry data 128 received. In some embodiments, the telemetry analysis engine 130 may be part of the telemetry processing engine 110.

Figure 2:
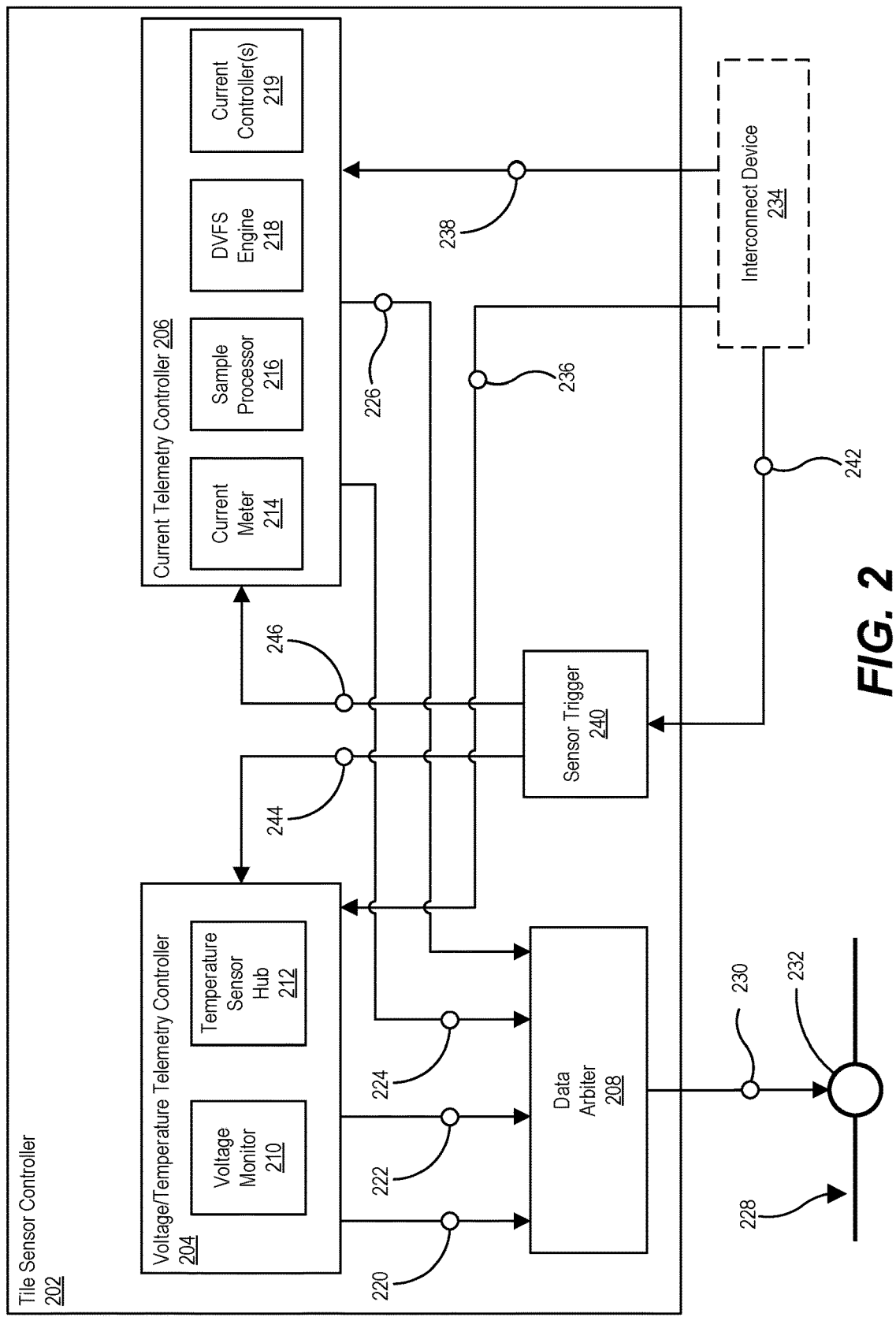
FIG. 2 illustrates an example tile sensor controller of the System-on-Chip architecture of FIG. 1 according to one or more embodiments.

FIG. 2 illustrates an example sub-architecture 200 of the SoC architecture 100 according to one or more embodiments. The sub-architecture 200 includes a tile sensor controller 202 corresponding to the tile sensor controller 108 of FIG. 1. The tile sensor controller 202 includes a voltage and/or temperature (VT) controller 204, a current telemetry controller 206, and a data arbiter 208. The VT telemetry controller 204 supports a voltage monitor 210 and/or a temperature sensor hub 212. The current telemetry controller 206 supports a one or more current meters 214, a sample processor 216, and/or a Dynamic Voltage and Frequency Scaling (DVFS) engine 218. The voltage monitor 210 and/or the temperature sensor hub 212 may be included as part of the VT telemetry controller 204 or be externally located and communicatively coupled to the VT telemetry controller 204. The current meter 214, the sample processor 216, and/or the DVFS engine 218 may be included as part of the current telemetry controller 206 or be externally located and communicatively coupled to the current telemetry controller 206.

The VT telemetry controller 204 receives voltage measurements from the voltage monitor 210 regarding operating voltage(s) applied to the processor cores 106. In some embodiments, the voltage measurements received may include measurements for other components in a tile, as described with respect to FIG. 3 infra. The VT telemetry controller 204 also receives temperature measurements from the temperature sensor hub 212, the temperature measurements indicating temperatures measured at one or more points in a tile, as also described with respect to FIG. 3 infra.

The VT telemetry controller 204 generates data packets including data regarding the voltage and temperature measurements obtained and sends the data packets to the data arbiter 208. More particularly, the VT telemetry controller 204 generates and sends voltage data packets 220 including data indicating the voltage measurements obtained by the voltage monitor 210. The VT telemetry controller 204 also generates and sends temperature data packets 222 including data indicating the temperature measurements obtained by the temperature sensor hub 212. In some embodiments, the VT telemetry controller 204 is configured to control voltage applied to the processor cores 106 (or other components of a tile) or control other aspects that may affect the temperature at points in the tile. In some embodiments, the VT telemetry controller 204 is configured to send signals to other components that use the signals, at least in part, to control voltage or affect the temperature at points in the tile. In some embodiments, voltage applied to the processor cores 106 may be controlled by one or more devices external to the VT telemetry controller 204—for example, the DVFS engine 218 may control voltage applied to individual processor cores 106.

The current telemetry controller 206 receives current measurements obtained by the current meter 214. The current measurements obtained may include a set of current measurements for current applied to individual cores of the set of processor cores 106. For example, the current meter 214 may include a first current meter for measuring current of a first processor core and may include a second current meter for measuring current of a second processor core. In some embodiments, the current meter 214 includes one or more on-die current meters (ODCMs). In some embodiments, the sample processor 216 generates statistical data regarding the current measurements obtained by the current meter 214. For instance, the sample processor 216 may determine an average current, a median current, a maximum current, or a minimum current of current measurements for a given time period, by way of non-limiting example. The current telemetry controller 206 generates and sends, to the data arbiter 208, current data packets 224 including data indicating the current measurements obtained by the current meter 214 and/or statistical data regarding the current measurements obtained.

The DVFS engine 218 may control the frequency and/or voltage applied to individual cores of the set of processor cores 106. The DVFS engine 218 may also monitor and/or control one or more states of the processor cores 106, such as the power consumption of individual cores or the performance level of individual cores. In some embodiments, the DVFS engine 218 may send messages or control signals to other components that control operational characteristics of the individual cores. Non-limiting examples of such components include voltage regulators (e.g., low-dropout regulators), current regulators (e.g., constant current regulators), and switching or frequency regulators (e.g., phase-locked loops). In some embodiments, the current telemetry controller 206 includes one or more current controllers 219 configured to control current applied to the processor cores 106 (or other components of a tile) or control other aspects that may affect the current applied to components in the tile. The one or more current controllers 219 may include a plurality of current controllers each configured to control current applied to an individual processing core of the processing cores 106.

In some embodiments, the current telemetry controller 206 sends, to the data arbiter 208, state or message data packets 226 regarding various parameters or states measured, detected, or otherwise observed by the DVFS engine 218. For example, the state data packets 226 may include data regarding the power consumption and/or performance level of individual processor cores 106. The state data of the state data packets 226 may be stored in the telemetry control memory 118.

The data packets sent by the VT telemetry controller 204 and/or the current telemetry controller 206 may have a defined format. For instance, the temperature data packets 222 may include an array of temperature measurement data, each element of the array indicating a temperature measurement for a certain point on the tile. As another example, the current data packets 224 may include an array of current measurement data, each element specific to an individual processor core 106. In some embodiments, the VT telemetry controller 204 and/or the current telemetry controller 206 may include timestamps indicating a time at which the measurements were received or sent to the data arbiter 208.

The data arbiter 208 includes logic (e.g., programmable logic, hardwired logic) for determining an order in which data packets contemporaneously received are to be conveyed to a channel 228 of the SoC architecture 100, the channel 228 corresponding to one of the channels 104 described with respect to FIG. 1. The data arbiter 208 may convey the data packets 230 to a mesh network router 232 that is communicatively coupled to the channel 228. The mesh network router 232 is described in detail with respect to FIG. 3 infra. The data arbiter 208 may include memory for temporary storage of data packets received from the VT telemetry controller 204 and the current telemetry controller 206.

The data arbiter 208, in some embodiments, may convey data packets 230 toward the channel 228 in the order they are received—for instance, according to a First In First Out (FIFO) technique. The data arbiter 208, in some embodiments, may convey data packets 230 toward the channel 228 according to a priority associated with the type of data packet. By way of example, the data arbiter 208 may include logic indicating that current data packets 224 have a highest priority, voltage data packets 220 have a second highest priority, temperature data packets 222 have a third highest priority, and state data packets 226 have the lowest priority.

The sub-architecture 200 may include an interconnect device 234 that is configured to send messages 236 to the VT telemetry controller 204 and/or send messages 238 to the current telemetry controller 206. The interconnect device 234 is, in some embodiments, a mesh network interconnect device and may be connected to one or more subchannels of the channels 104. The interconnect device 234 may be communicatively coupled to the system control processor 120 described with respect to FIG. 1 and elsewhere herein. In such embodiments, one or more of the messages 126 may be sent to the tile sensor controller(s) 108 via the interconnect device 234. The interconnect device 234 may send messages from the system control processor 120 to the VT telemetry controller 204 and/or the current telemetry controller 206 of a tile sensor controller 202 associated with a particular one of the mesh nodes 102 based on the data packets received.

The messages 236 and/or 238 may be generated as a result of detection of one or more defined conditions by the system control processor 120. The message 236 and/or the message 238 may respectively cause the VT telemetry controller 204 or the current telemetry controller 206 to perform one or more remediation actions. A remediation action may include reinitializing or adjusting operation of the voltage monitor 210, the temperature sensor hub 212, the current meter 214, the sample processor 216, or the DVFS engine 218. For example, a remediation action may include adjusting a sampling rate of the voltage monitor 210, the temperature sensor hub 212, the current meter 214, the sample processor 216, and/or the DVFS engine 218. As another example, a remediation action may cause the VT telemetry controller 204 or the current telemetry controller 206 to reset or synchronize one or more devices to align the measurements in the same epoch.

The messages 236 and/or 238 may respectively cause the VT telemetry controller 204 and/or the current telemetry controller 206 to reset or reinitialize in connection with a synchronization process. The synchronization process may include receipt, by tile sensor controllers 108 of two or more of the mesh nodes 102, of messages 126 causing the interconnect device 234 to send the message 236 or the message 238.

In some embodiments, the sub-architecture 200 includes a sensor trigger 240 that transitions the VT telemetry controller 204 and/or the current telemetry controller 206 to operate between a first mode in which telemetry data collection is enabled and a second mode in which telemetry data collection is disabled. The tile sensor controller 202, the VT telemetry controller 204, the current telemetry controller 206, and/or constituent components thereof may enable/disable telemetry data collection based on one or more logic states associated with the sensor trigger 240.

In some embodiments, the sensor trigger 240 includes memory (e.g., RAM, a register) comprising a set of bits having a value or values that correspond to telemetry collection states of the tile sensor controller 108, 202; the VT telemetry controller 204; and/or the current telemetry controller 206. The value of each of the set of bits may be controlled based on a message 242 initiated by the system control processor 120 (e.g., via the interconnect device 234). In some embodiments, the set of bits of the sensor trigger 240 may include a first set of bits for enabling/disabling temperature telemetry data collection associated with the VT telemetry controller 204, a second set of bits for enabling/disabling voltage telemetry data collection associated with the VT telemetry controller 204, and/or a third set of bits for enabling/disabling current telemetry data collection associated with the current telemetry controller 206. In some embodiments, the set of bits of the sensor trigger 240 may include a single bit for enabling/disabling all telemetry data collection associated with each tile sensor controller 202.

The tile sensor controller 202, the VT telemetry controller 204, the current telemetry controller 206, and/or constituent components thereof may transition from the first mode to the second mode in response to detecting a change or changes from a first value to a second value (e.g., binary zero (0) to binary one (1)) of the set of bits associated with the sensor trigger 240. The tile sensor controller 202, the VT telemetry controller 204, the current telemetry controller 206, and/or constituent components thereof may transition from the second mode to the first mode in response to detecting a change or changes from the second value to the first value (e.g., binary one (1) to binary zero (0)) of the set of bits associated with the sensor trigger 240.

In some embodiments, the sensor trigger 240 includes logic (e.g., programmable logic, hardwired logic) configured to send a message 244 to the VT telemetry controller 204 for enabling/disabling temperature telemetry data collection and/or voltage telemetry data collection associated therewith. In some embodiments, the sensor trigger 240 includes logic (e.g., programmable logic, hardwired logic) configured to send a message 246 to the current telemetry controller 206 for enabling/disabling current telemetry data collection and/or state data collection associated therewith. In some embodiments, the message 244 and the message 246 may be a single message enabling/disabling telemetry data collection associated with the tile sensor controller 108, 202.

The tile sensor controller 202, the VT telemetry controller 204, the current telemetry controller 206, and/or constituent components thereof may transition from the first mode to the second mode in response to receiving the message 244 and/or the message 246 providing instructions or control signals for disabling telemetry data collection. The tile sensor controller 202, the VT telemetry controller 204, the current telemetry controller 206, and/or constituent components thereof may transition from the second mode to the first mode in response to receiving the message 244 and/or the message 246 providing instructions or control signals for enabling telemetry data collection.

The tile sensor controller 202, the VT telemetry controller 204, the current telemetry controller 206, and/or constituent components thereof may start, discontinue, or restart telemetry data collection based on a defined event. For instance, the VT telemetry controller 204 and the current telemetry controller 206 may be initiated, at a first time, transition from the second mode (disabled telemetry collection) to the first mode (enabled telemetry collection) based on the sensor trigger 240. The VT telemetry controller 204 and/or the current telemetry controller 206 may begin collecting telemetry data at a second time after the first time in response to detecting a signal edge in a clock signal or other designated signal. The same principle may also apply to disabling telemetry data collection.

In response to receiving a sensor trigger 240 signal for enabling telemetry data collection, the telemetry sources begin collection of telemetry data contemporaneously or as close to simultaneously as possible. For instance, in response to receipt of the messages 244 and 246, the VT controller 204 and the current telemetry controller 206 may each begin collecting telemetry data immediately or upon detection of the same event (e.g., a rising edge of a clock). As another example, a tile sensor controller 202 of two or more of the mesh nodes 102 may begin collecting telemetry data immediately or upon detection of the same event. Beginning telemetry data collection contemporaneously or simultaneously facilitates temporal alignment of telemetry data sampling and helps to reduce the length of an epoch period.

Each of the tile sensor controllers 202 is configured, in some embodiments, to detect some errors occurring locally, e.g., related to temperature, voltage, and/or current telemetry data collection. The tile sensor controller(s) 202, for instance, may be configured to detect sampling errors associated with one or more analog-to-digital converters involved in collecting telemetry data. The tile sensor controller(s) 202 may generate interrupts that are provided to the system control processor 120, which may initiate remediation actions to resolve or correct the local errors detected by the corresponding tile sensor controller(s) 202.

Figure 3:
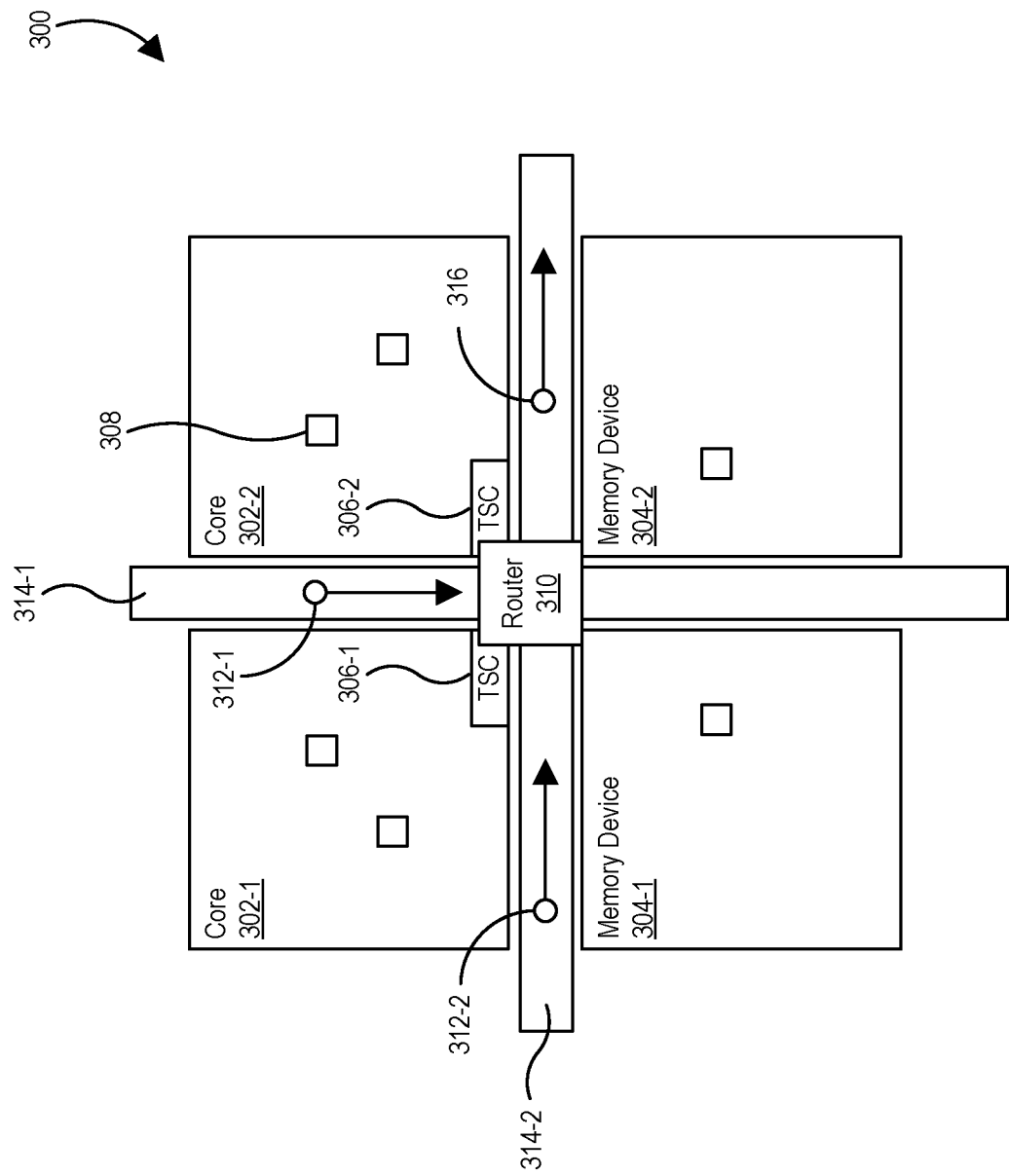
FIG. 3 illustrates an example tile of the System-on-Chip architecture of FIG. 1 according to one or more embodiments.

FIG. 3 illustrates an example mesh network tile 300 associated with a single mesh node of the SoC architecture of FIG. 1 according to one or more embodiments. The tile 300 includes a first processor core 302-1, a second processor core 302-2, a first memory device 304-1, and a second memory device 304-2. The processor cores 302-1 and 302-2 (collectively "processor cores 302") correspond to the set of processor cores 106 described with respect to FIG. 1 and elsewhere herein.

The memory devices 304-1 and 304-2 (collectively "memory devices 304") each include one or more types of volatile memory for storing data packets. The memory devices 304, more specifically, include cache memory (e.g., L3 cache memory), and may include static random-access memory (SRAM), dynamic random-access memory (DRAM), and/or double data rate (DDR) memory. In some embodiments, the memory devices 304 may each include logic (e.g., programmable logic, hardwired logic) configured to process and fulfill requests for reading and/or writing data to memory. In some embodiments, the memory devices 304-1 and 304-2 receive and store telemetry data associated with the processor cores 302-1 and 302-2. In some embodiments, the memory devices 304 receive and store data packets associated with processor cores of other tiles.

The tile 300 includes a tile sensor controller 306-1 coupled to the processor core 302-1 and a tile sensor controller 306-2 coupled to the processor core 302-2. The tile sensor controllers 306-1 and 306-2 correspond to the tile sensor controller 202 discussed with respect to FIG. 2. The tile 300 also includes a plurality of temperature sensors 308 integrated with or affixed to the processor cores 302 and the memory devices 304. In FIG. 3, two temperature sensors measure temperature at locations on each of the processor cores 302, and a single temperature sensor measures temperature at a location on each of the memory devices 304. In some embodiments, there may be a different number of temperature sensors on the tile 300 provided in different locations than those shown. The tile sensor controllers 306-1 and 306-2 may each receive the messages 236 and/or 238 in connection with performance of a remediation action, as described with respect to FIG. 2 and elsewhere herein.

In some embodiments, a current controller may be associated with or included in each core 302. The current controller of each core 302 is configured to selectively adjust a current consumed by the individual core 302, e.g., based on instructions or control signals provided by the telemetry analysis engine 130. The current controller of each core 302 may also be configured to generate time information, such as a timestamp, indicating a time at which individual current measurements were obtained. The time information may be provided by each current controller to the tile sensor controller 306. In some embodiments, adjustment of current consumed by an individual core 302 is controlled by the DVFS engine 218 associated with the individual core 302 based on the current measurements by the current meter 214.

The tile 300 also includes a mesh network router 310 that is configured to receive telemetry data from routers of other tiles. The mesh network router 310 routes the telemetry data received from other tiles. In some embodiments, the mesh network router 310 may obtain telemetry data stored in the memory device 304-1 and/or the memory device 304-2 and send the telemetry data obtained to an adjacent tile in the mesh node network.

As a particular non-limiting example illustrating operation of the mesh network router 310 for a given epoch, the mesh node 102-8 of FIG. 1 may include the tile 300. The mesh network router 310 may receive, at a first time, data packets including telemetry data associated with the processor cores 302 from one or both of the tile sensor controllers 306. The mesh network router 310 may receive, at a second time after the first time, a set of data packets 312-1 including telemetry data over a channel 314-1 from the mesh node 102-5. The mesh network router 310 may receive, at a third time after the second time, a set of data packets 312-2 including telemetry data over a channel 314-2 from the mesh node 102-7. The mesh network router 310 sends a set of data packets 316 corresponding to the telemetry data associated the processor core 302-1 and/or the processor core 302-2 to an adjacent tile in the network of mesh nodes 102. The mesh network router 310 also sends the sets of data packets 312-1 and 312-2 to the adjacent tile. In some embodiments, the mesh network router 310 may send the telemetry data to the adjacent tile in the order in which the telemetry data becomes available to the mesh network router 310.

The mesh network routers 310 of the mesh nodes 102 in the SoC architecture 100 communicate with each other to determine how data packets will be routed to reach the telemetry processing engine 110. The mesh network routers 310 communicate to determine a first set of adjacent mesh nodes to which an individual mesh node will send data packets. The mesh network routers 310 also communicate to determine a second set of adjacent mesh nodes from which each individual mesh node will receive data packets. As shown in the SoC architecture 100, the mesh nodes 102 cooperate with each other to propagate data packets to the assigned mesh node (mesh node 102-9 in this example), which will provide the telemetry data 112 to the telemetry processing engine 110.

The mesh network routers 310 may, from time to time, communicate different routes for the data packets over time. The set of routes shown in FIG. 1, for instance, may be established for a first epoch. The mesh network routers 310 may determine a different set of routes for the data packets. In some embodiments, the adjacent mesh node to which a given mesh network router 310 sends telemetry data may change from one epoch to another epoch. In some embodiments, the adjacent node to which a given mesh network router 310 sends telemetry data may be static and remain unchanged from a first epoch to a second epoch.

An issue associated with the foregoing framework is that the data packets may arrive at the telemetry memory bridge 116 in a different order than which they were sent by the mesh network routers 310 or generated by the tile sensor controllers 108. Factors affecting receipt of data packets by the telemetry processing engine 110 include physical location of a tile in the mesh network, traffic on the channels 114, sampling rate of various telemetry data, and/or DVFS engine traffic, by way of non-limiting example.

Figure 4A:
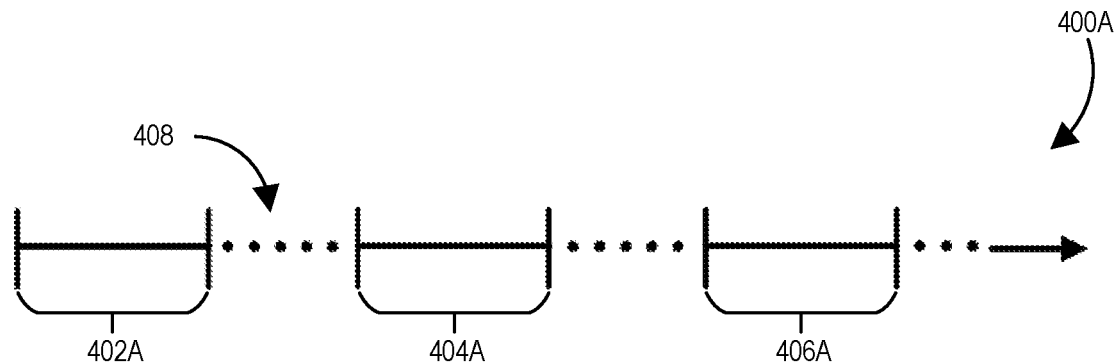
FIG. 4A illustrates a first example telemetry epoch for the System-on-Chip architecture of FIG. 1 according to one or more embodiments.

FIG. 4A illustrates an example timeline 400A of a first set of telemetry epochs of telemetry data received by the telemetry processing engine according to one or more embodiments. The timeline 400A comprises a first epoch 402A, a second epoch 404A, and a third epoch 406A. For the timeline 400A, the SoC architecture 100 is subject to a first set of conditions. The first set of conditions involve, for example, a first sampling rate at which the tile sensor controllers 108 obtain telemetry data. As a result of the first set of conditions, each epoch is completed before the next epoch begins. The timeline 400A, for instance, includes a time period 408 between the first epoch 402A and the second epoch 404A in which telemetry data is not received by the telemetry processing engine 110. In some implementations, as a result of detecting the time period 408, the telemetry processing engine 110 may increase the sampling rate at which the telemetry data is obtained by the tile sensor controllers 108.

Figure 4B:
FIG. 4B illustrates a second example telemetry epoch for the System-on-Chip architecture of FIG. 1 according to one or more embodiments.

FIG. 4B illustrates an example timeline 400B of a second set of telemetry epochs of telemetry data received by the telemetry processing engine according to one or more embodiments. The timeline 400B comprises a first epoch 402B, a second epoch 404B, and a third epoch 406B. For the timeline 400B, the SoC architecture 100 is subject to a second set of conditions. The second set of conditions involve, for example, a second sampling rate at which the tile sensor controllers 108 obtain telemetry data, the second sampling rate faster than the first sampling rate discussed with respect to FIG. 4A. As a result of the second set of conditions, the second epoch 404B begins immediately after the first epoch 402B and the third epoch 404C begins immediately after the second epoch 404B. For instance, there are very small or no time periods 408 between adjacent epochs in the timeline 400B.

Figure 4C:
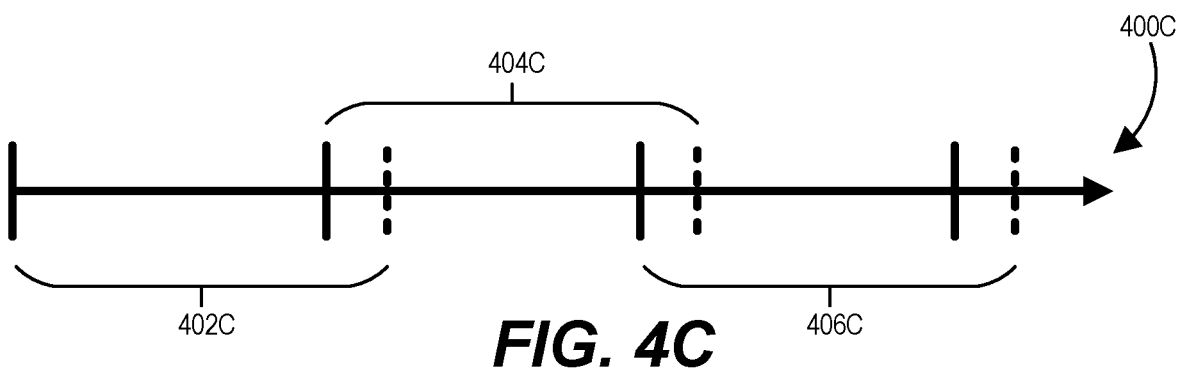
FIG. 4C illustrates a third example telemetry epoch for the System-on-Chip architecture of FIG. 1 according to one or more embodiments.

FIG. 4C illustrates an example timeline 400C of a third set of telemetry epochs of telemetry data received by the telemetry processing engine according to one or more embodiments. The timeline 400C comprises a first epoch 402C, a second epoch 404C, and a third epoch 406C. For the timeline 400C, the SoC architecture 100 is subject to a third set of conditions. The third set of conditions involve, for example, a third sampling rate at which the tile sensor controllers 108 obtain telemetry data, the third sampling rate faster than the second sampling rate discussed with respect to FIG. 4B. As a result of the third set of conditions, the second epoch 404C begins before the first epoch 402C is complete and the third epoch 406C begins before the second epoch 404C is complete. The conditions that affect the occurrence of a next epoch relative to a current epoch include sampling rate, telemetry data congestion in the SoC architecture, and processing speed of various components in the SoC architecture 100.

Referring back to FIG. 1, parameters of the SoC architecture 100 may be controlled to adjust the occurrence of a next epoch relative to a current epoch. The system control processor 120 and/or the management control processor 122 may generate interrupts in response to detecting the occurrence of various conditions or errors associated with telemetry data or the collection thereof. In some implementations, the presence of various error conditions may be detected in which an incomplete set of telemetry data is obtained for a given epoch. In some embodiments, the telemetry memory bridge 116 may detect the presence of one or more error conditions described herein and generate the error status 125, such as an interrupt, provided to or otherwise observable by the sensor control processor 120 and/or the management control processor 122.

In response to detecting an error condition, the telemetry memory bridge 116 may generate the error status 125 causing the system control processor 120 to adjust operation of one or more of the tile sensor controllers 108. A first error condition corresponds to a condition in which a first set of telemetry data for a first epoch is received, a second set of telemetry data for a second epoch is received, and telemetry data for a third epoch is received while the first set of telemetry data is incomplete. A second error condition corresponds to a condition in which a complete second set of telemetry data for a second epoch is received while a first set of telemetry data for a first epoch preceding the second epoch is incomplete. The system control processor 120 may issue a first sensor trigger signal message causing the tile sensor controller(s) 108, 202 to temporarily disable telemetry data collection for one or more types of telemetry data. The system control processor 120 may issue a second sensor trigger signal message causing the tile sensor controller(s) 108, 202 to reenable or reinitiate telemetry data collection for one or more types of telemetry data.

The telemetry memory bridge 116 may detect the presence of a third error condition in which incrementing a write pointer for a given circular buffer would cause the write pointer to match a position of the read pointer. In response to detecting the third error condition, the telemetry memory bridge 116 may generate an interrupt to adjust operation of one or more of the tile sensor controllers 108. Generation of an interrupt may cause the management control processor 122 or the system control processor 120 to send a message 126 to one or more of the tile sensor controllers 108.

The message 126 may cause the tile sensor controller(s) 108 to adjust a sampling rate of one or more types of telemetry data in some embodiments. For instance, as a result of detecting the condition described with respect to FIG. 4C, a message 126 may be sent to one or more of the tile sensor controllers 108 to synchronize telemetry data by resetting or reinitializing the voltage monitor 210, the temperature sensor hub 212, or the current meter 214. As a result of detecting a buffer overrun condition in which incrementing the write pointer would cause the position of the write pointer to match the position of the read pointer, a message 126 may be sent to one or more of the tile sensor controllers 108 to reduce a sampling rate for one or more types of telemetry data. In some implementations, in response to detecting a buffer overrun condition, the system control processor 120 may reset the write pointer and the read pointer to an initial position of the buffer.

Figure 5A:
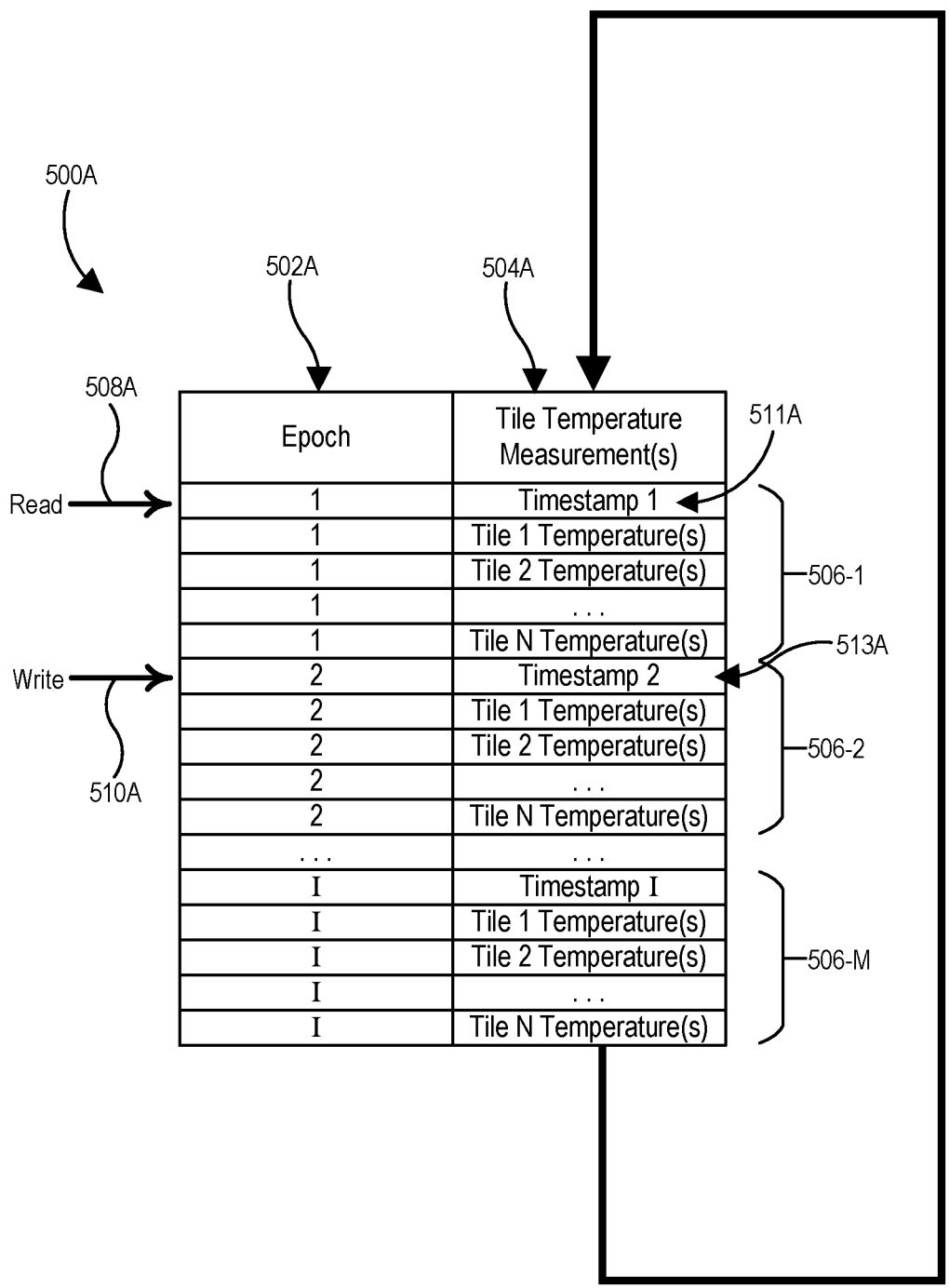
FIG. 5A illustrates a first example memory buffer for the System-on-Chip architecture of FIG. 1 according to one or more embodiments.

FIG. 5A illustrates a first circular buffer 500A in which telemetry data of a first type are stored according to one or more embodiments. The type of telemetry data stored in the first circular buffer 500A correspond to temperature measurements associated with tiles 300 of the SoC architecture 100. The first buffer 500A includes a first plurality of entries 502A that identify an epoch with which the telemetry data is associated. The first buffer 500A also includes a second plurality of entries 504A for storing the telemetry data received.

The first buffer 500A has a size configured to store telemetry data for a number I of epochs and a number N of temperature entries for each of the epochs. More particularly, a subset of temperature telemetry entries 506-1 for a first epoch has a number N of temperature telemetry data entries, the number N corresponding to the number of mesh nodes 102 in the SoC architecture 100. As a particular non-limiting example, the number N for the SoC architecture 100 shown in FIG. 1 is nine; however, the number N may be different based on the design of the SoC architecture 100. In some embodiments, each entry in the second plurality of entries 504A is configured to store an array of temperature telemetry data entries. With reference to FIG. 3, for example, each entry in the second plurality of entries 504A includes six instances of temperature telemetry data, each of the six instances corresponding to a temperature measurement by one of the six temperature sensors 308. The size of the first buffer 500A (e.g., number of epochs I) may be selected based on the sampling rate or range of sampling rates of the temperature telemetry data and/or the number of temperature sensors.

The first buffer 500A includes or has associated therewith a plurality of data objects. A first data object is a read pointer 508A that specifies a set of entries in the first buffer 500A to be read next by the system control processor 120, the management control processor 122, and/or other entity of or associated with the SoC architecture 100. The read pointer 508A may point to a first entry in the set of temperature telemetry data entries 506 to be read. The first entry may include time information associated with the set of entries, as discussed below. In response to the temperature telemetry data being read from the set of entries indicated by the read pointer 508A (e.g., associated with temperature telemetry data for the tile 300 of the mesh node 102-1), a position of the read pointer 508A is updated to point to the next subset of temperature telemetry data— in this case, updated to point to the first entry in the subset of entries 506-2 of temperature telemetry data for tile 102-2 in second epoch.

A second data object is a write pointer 510A that specifies a set of the second entries 504A in the first buffer 500A for which temperature telemetry data will next be written. The write pointer 510A may point to a first entry in the set of entries to be written. In response to all the temperature telemetry data being written to a subset of temperature telemetry entries 506-2 with which the write pointer 510A is associated, a position of the write pointer 510A is updated to point to the next subset of temperature telemetry entries 506-3 (not shown). The write pointer 510A may be updated by the telemetry memory bridge 116 in some embodiments.

In the first buffer 500A, the read pointer 508A is advanced to the next subset of temperature telemetry entries after all entries in the current subset of entries with which the read pointer 508A is associated are read. For instance, the read pointer 508A may be updated from the first entry in the subset of entries 506-1 to the first entry in the subset of entries 506-2 after telemetry data is read from every entry in the subset of entries 506-1. In some embodiments, the management control processor 122 advances the read pointer 508A to the next subset of entries 506.

The write pointer 510A is advanced to the next set of temperature telemetry entries after all entries in the set of entries with which the write pointer 510A is associated are written. For instance, the write pointer 510A may be updated from the first entry in the subset of entries 506-2 to the first entry in the subset of entries 506-3 (not shown) after temperature telemetry data is written to all entries in the subset of entries 506-2. In some embodiments, the telemetry memory bridge 116 advances the write pointer 510A to the next subset of entries 506.

As a result of reading the telemetry data in the last entry in the first buffer 500A (e.g., entry for Tile N temperature of Epoch I), the position of the read pointer 508A is moved back to the first entry in the first buffer 500A (e.g., entry for Tile 1 of first epoch). As a result of writing telemetry data to the last remaining empty entry in the subset of temperature telemetry entries 506-M, the position of the write pointer 510A is moved back to the subset of temperature telemetry entries 506-1 in the first buffer 500A (e.g., entry for Tile 1 of the first epoch).

The telemetry processing engine 110 is configured to detect various buffer error conditions associated with the first buffer 500A. The telemetry memory bridge 116 may detect a buffer overrun condition in response to a determination that advancing the write pointer 510A would position the write pointer 510A at the same set of entries as the read pointer 508A. Detection of the overrun condition, for instance, may include an attempt by the telemetry memory bridge 116 to write an entry to a same set of telemetry data entries 506 to which the read pointer 508A is pointing. As a result of detecting the buffer overrun condition, the telemetry memory bridge 116 may generate an interrupt, which is provided to or otherwise detected by the system control processor 120 and/or the management control processor 122. In response to registering the buffer overrun condition, in some implementations, the management control processor 122 may reset a position of the read pointer 508A and/or a position of the write pointer 510A to an initial position of the first buffer 500A. In connection with the buffer overrun condition, the system control processor 120 may adjust operation of one or more tile sensor controllers 202, such as by reinitializing the controllers and/or the sensors to sample the temperature telemetry data at a different sampling rate.

In some embodiments, the telemetry memory bridge 116 generates a timestamp 511A or other time information indicating a time at which a first entry or entries among a subset of temperature telemetry entries 506 is received. It is noted that the subset of temperature telemetry entries 506 for a given epoch are not necessarily received in consecutive order or at once. The telemetry memory bridge 116 includes the timestamp 511A in the second entries 504A of the first buffer 500A in the telemetry control memory 118. For instance, a first timestamp 511A may be included in the subset of temperature telemetry entries 506-1 for the first epoch, a second timestamp 513A may be included in the subset of temperature telemetry entries 506-2 for the second epoch, and so on. In some embodiments, the timestamps may be included as their own respective entries in the second entries 504A. In some embodiments, the tile sensor controller 108 of a mesh node 102 may prepend timestamps to the temperature telemetry data, which is then transmitted to the telemetry memory bridge 116 via the channels 104.

In some embodiments, the temperature telemetry data may include an address or identifier associated with the tile or mesh node for which the temperature telemetry data was generated. The telemetry memory bridge 116 compares the address with addresses of the tiles 0, 1, . . . N and, based on a match between the addresses, stores the temperature telemetry data in the first buffer 500A. For the subset of temperature telemetry entries 506-1, the telemetry memory bridge 116 may receive telemetry data 114-2 including temperature telemetry data associated with the mesh node 102-2 (see FIG. 1). Based on an address or identifier in the telemetry data 114-2, the telemetry memory bridge 116 writes the temperature telemetry data to the Tile 2 Temperature location in the first buffer 500A for the subset of temperature telemetry entries 506-1.

Figure 5B:
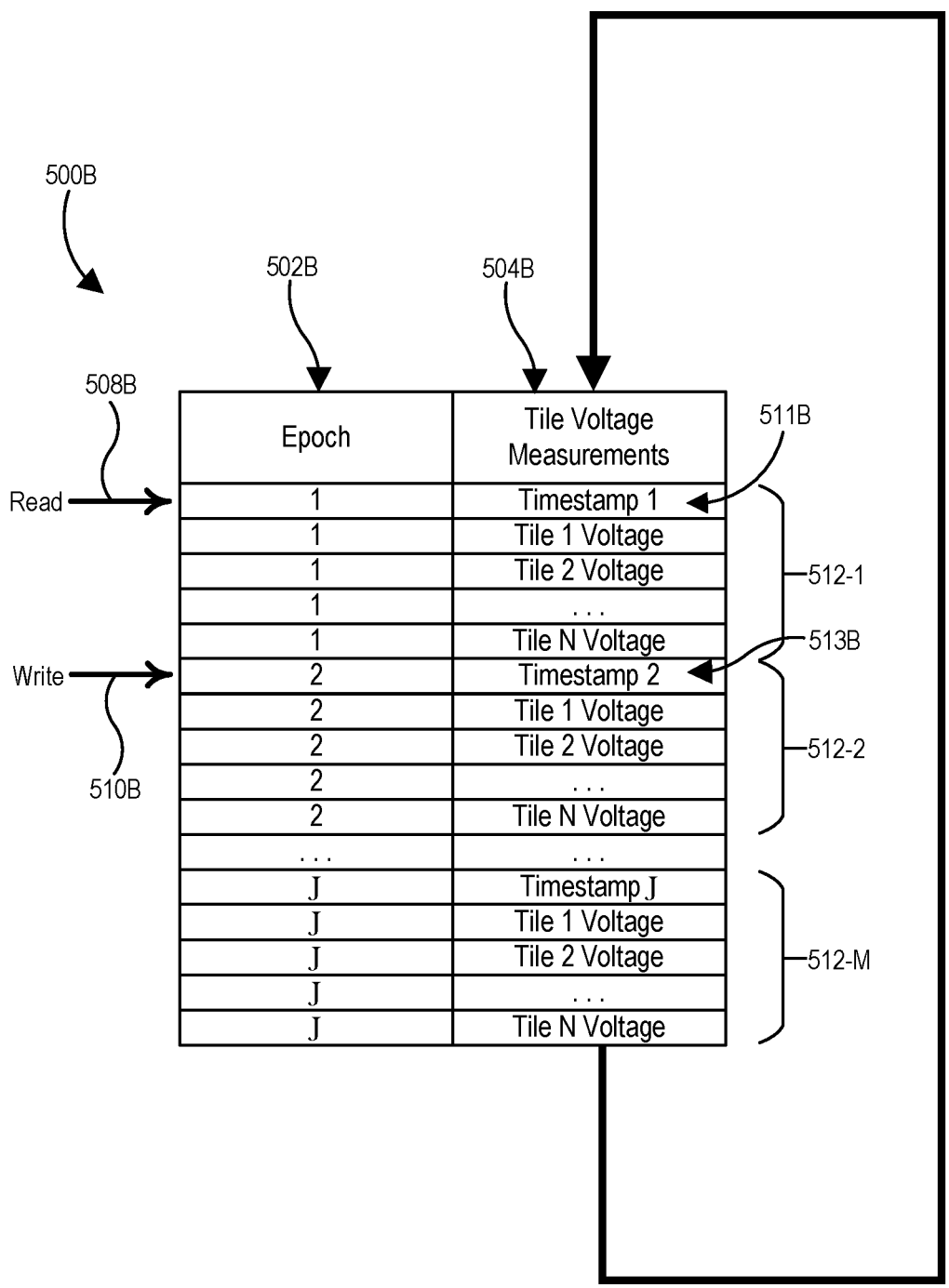
FIG. 5B illustrates a second example memory buffer for the System-on-Chip architecture of FIG. 1 according to one or more embodiments.

FIG. 5B illustrates a second circular buffer 500B in which telemetry data of a second type are stored according to one or more embodiments. The type of telemetry data stored in the second circular buffer 500B corresponds to voltage measurements associated with tiles 300 of the SoC architecture 100. The second buffer 500B includes a first plurality of entries 502B that identify an epoch with which the telemetry data is associated. The second buffer 500B also includes a second plurality of entries 504B for storing the telemetry data received.

The second buffer 500B has a size configured to store telemetry data for a number J of epochs and a number N of voltage entries for each of the epochs. More particularly, a subset of voltage telemetry entries 512-1 for a first epoch has a number N of voltage telemetry data entries, the number N corresponding to the number of mesh nodes 102 in the SoC architecture 100. The second buffer 500B, in some embodiments, has the same size as the first buffer 500A. In some embodiments, each entry in the second plurality of entries 504B is configured to store an array of voltage telemetry data entries. In some embodiments, the voltage telemetry data stored in the voltage telemetry data entries may represent a voltage observed or measured by the voltage monitor 210. The size of the second buffer 500B (e.g., number of epochs J) may be selected based on the sampling rate or range of sampling rates of the voltage telemetry data.

The second buffer 500B includes or has associated therewith a plurality of data objects. A first data object is a read pointer 508B that specifies an entry in the second buffer 500B to be read next by the system control processor 120, the management control processor 122, and/or other entity of or associated with the SoC architecture 100. The read pointer 508B may point to a first entry in the set of voltage telemetry data entries 512 to be read. The first entry may include time information associated with the set of entries, as discussed below. In response to the voltage telemetry data being read from the set of entries indicated by the read pointer 508B (e.g., associated with voltage telemetry data for the tile 300 of the mesh node 102-1), a position of the read pointer 508B is updated to point to the next subset of voltage telemetry data—in this case, updated to point to the first entry in the subset of entries 512-2 of voltage telemetry data for tile 102-2 in the second epoch.

A second data object is a write pointer 510B that specifies a set of the second entries 504B in the second buffer 500B for which voltage telemetry data will next be written. The write pointer 510B may point to a first entry in the set of entries to be written. In response to all the voltage telemetry data being written to a subset of voltage telemetry entries 512-2 with which the write pointer 510B is associated, a position of the write pointer 510B is updated to point to the subset of voltage telemetry entries 512-3 (not shown). The write pointer 510B may be updated by the telemetry memory bridge 116 in some embodiments.

In the second buffer 500B, the read pointer 508B is advanced to a next subset of entries after all entries in the current subset of entries with which the read pointer 508B is associated are read. For instance, the read pointer 508B may be updated from the first entry in the subset of entries 512-1 to the first entry in the subset of entries 512-2 after telemetry data is read from every entry in the subset of entries 512-1. In some embodiments, the management control processor 122 advances the read pointer 508B to the next subset of entries 512.

The write pointer 510B is advanced to the next set of voltage telemetry entries after all entries in the set of entries with which the write pointer 510B is associated are written. For instance, the write pointer 510B may be updated from the first entry in the subset of entries 512-2 to the first entry in the subset of entries 512-3 (not shown) after voltage telemetry data is written to all entries in the subset of entries 512-2. The telemetry memory bridge 116 is configured to advance the write pointer 510B in some embodiments.

As a result of reading the telemetry data in the last entry in the second buffer 500B (e.g., entry for Tile N voltage of Epoch J), the position of the read pointer 508B is moved back to the first entry in the second buffer 500B (e.g., entry for Tile 1 of first epoch). As a result of writing telemetry data to the last remaining empty entry in the subset of voltage telemetry entries 512-M, the position of the write pointer 510B is moved back to the subset of voltage telemetry entries 512-1 in the second buffer 500B (e.g., entry for Tile 1 of first epoch).

The telemetry processing engine 110 is configured to detect various buffer error conditions associated with the second buffer 500B. The telemetry memory bridge 116 may detect a buffer overrun condition in response to a determination that advancing the write pointer 510B would position the write pointer 510B at the same set of entries as the read pointer 508B. Detection of the overrun condition, for instance, may include an attempt by the telemetry memory bridge 116 to write an entry to a same set of telemetry data entries 512 to which the read pointer 508B is pointing. As a result of detecting the buffer overrun condition, the telemetry memory bridge 116 may generate an interrupt, which is provided to or otherwise detected by the system control processor 120 and/or the management control processor 122. In response to registering the buffer overrun condition, in some implementations, the management control processor 122 may reset a position of the read pointer 508B and/or a position of the write pointer 510B to an initial position of the first buffer 500B. In connection with the buffer overrun condition, the system control processor 120 may adjust operation of one or more tile sensor controllers 202, such as by reinitializing the controllers and/or the sensors to sample the voltage telemetry data at a different sampling rate.

In some embodiments, the telemetry memory bridge 116 generates a timestamp 511B or other time information indicating a time at which a first entry or entries among a subset of voltage telemetry entries 512 is received. It is noted that the subset of voltage telemetry entries 512 for a given epoch are not necessarily received in consecutive order or at once. The telemetry memory bridge 116 includes the timestamp 511B in the second entries 504B of the second buffer 500B in the telemetry control memory 118. For instance, a first timestamp may be included in the subset of voltage telemetry entries 512-1 for the first epoch, a second timestamp may be included in the subset of voltage telemetry entries 512-2 for the second epoch, and so on. In some embodiments the timestamp 511B may be included as its own entry in the second entries 504B. In some embodiments, the tile sensor controller 108 of a mesh node 102 may prepend timestamps to the voltage telemetry data, which is then transmitted to the telemetry memory bridge 116 via the channels 104.

In some embodiments, the voltage telemetry data may include an address or identifier associated with the tile or mesh node for which the voltage telemetry data was generated. The telemetry memory bridge 116 compares the address with addresses of the tiles 0, 1, . . . N and, based on a match between the addresses, stores the voltage telemetry data in the second buffer 500B. For the subset of voltage telemetry entries 512-1, the telemetry memory bridge 116 may receive telemetry data 114-2 including voltage telemetry data associated with the mesh node 102-2 (see FIG. 1). Based on an address or identifier in the telemetry data 114-2, the telemetry memory bridge 116 writes the voltage telemetry data to the Tile 2 Voltage location in the second buffer 500B for the subset of voltage telemetry entries 512-1.

Figure 5C:
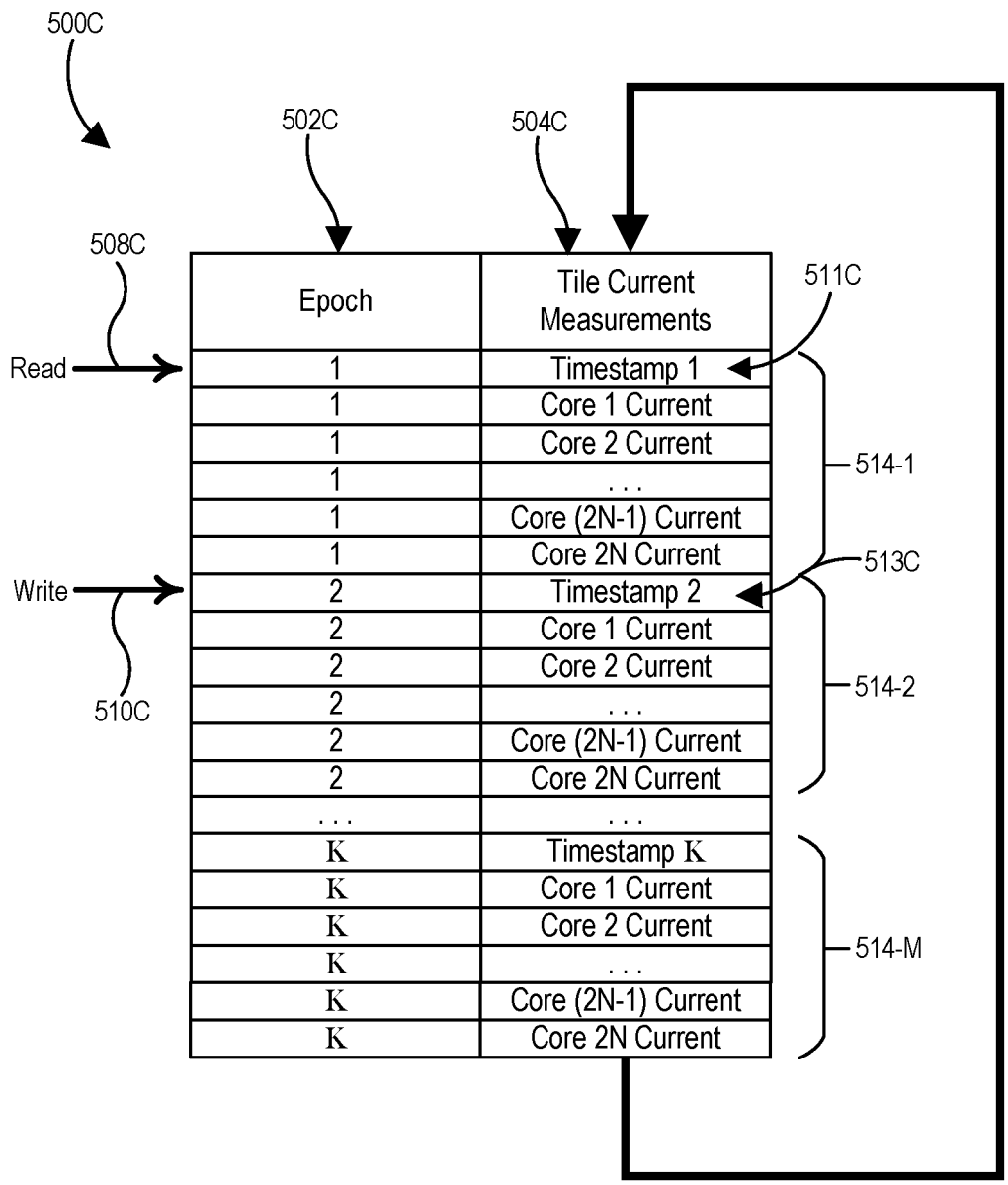
FIG. 5C illustrates a third example memory buffer for the System-on-Chip architecture of FIG. 1 according to one or more embodiments.

FIG. 5C illustrates a third circular buffer 500C in which telemetry data of a third type are stored according to one or more embodiments. The type of telemetry data stored in the third circular buffer 500C corresponds to measurements associated with tiles 300 of the SoC architecture 100. The third buffer 500C includes a first plurality of entries 502C that identify an epoch with which the telemetry data is associated. The third buffer 500C also includes a second plurality of entries 504C for storing the current telemetry data received.

The third buffer 500C has a size configured to store telemetry data for a number K of epochs and a number 2N of current entries for each of the epochs. More particularly, subset of current telemetry entries a first subset of current telemetry entries 514-1 for a first epoch has a number 2N of current telemetry data entries, the number N corresponding to the number of mesh nodes 102 in the SoC architecture 100. In some embodiments, the number of current telemetry data entries for a given epoch is based on the number of processor cores 106 associated with each of the mesh nodes 102. For example, if the number of processor cores 106 associated with each mesh node 102 is four, then the number of current telemetry data entries for a given epoch is 4N. The size of the third buffer 500C (e.g., number of epochs K) may be selected based on the sampling rate of the current telemetry data and/or the number of processor cores 106 of in a tile 300.

In some embodiments, the current telemetry data stored in a current telemetry data entry may represent a current current observed or measured by the current meter 214. In some embodiments, the current telemetry data stored in a current telemetry data entry may represent a statistical value generated by the sample processor 216 based on a plurality of current measurements obtained by the current meter 214 over a given time period. As described herein, the statistical value may be an average, a median, a maximum, or a minimum, by way of non-limiting example.

The third buffer 500C includes or has associated therewith a plurality of data objects. A first data object is a read pointer 508C that specifies an entry in the third buffer 500C to be read next by the system control processor 120, the management control processor 122, and/or other entity of or associated with the SoC architecture 100. The read pointer 508C may point to a first entry in the set of current telemetry data entries 514 to be read. In response to the current telemetry data being read from the set of entries indicated by the read pointer 508C (e.g., associated with current telemetry data for the tile 300 of the mesh node 102-1), a position of the read pointer 508C may be updated to point to the next subset of current telemetry data—in this case, updated to point to the first entry in the subset of entries 514-2 of current telemetry data for tile 102-2 in the second epoch.

In some embodiments, the first entry in a subset of entries 514 may include time information associated with the set of entries. In some embodiments, each current telemetry data entry in the plurality of entries 504C may include or reference (e.g., via a pointer) time information associated with the current telemetry data entry. In such embodiments, the current meter(s) 214 in the current telemetry controllers 206 may generate time information indicating a time at which the current telemetry data was obtained and include the time information with the current telemetry data.

A second data object is a write pointer 510C that specifies a set of the second entries 504C in the third buffer 500C for which current telemetry data will next be written. The write pointer 510C may point to a first entry in the set of entries to be written. In response to all the current telemetry data being written to a subset of current telemetry entries 514-2 with which the write pointer 510C is associated, a position of the write pointer 510C is updated to point to the next subset of current telemetry entries 514-3 (not shown). The write pointer 510C may be updated by the telemetry memory bridge 116 in some embodiments.

In the third buffer 500C, the read pointer 508C is advanced to a next subset of entries after all entries in the current subset of entries with which the read pointer 508C is associated are read. For instance, the read pointer 508C may be updated from the first entry in the subset of entries 514-1 to the first entry in the subset of entries 514-2 after telemetry data is read from every entry in the subset of entries 514-1. In some embodiments, the management control processor 122 advances the read pointer 508C to the next subset of entries 514.

The write pointer 510C is advanced to the next set of current telemetry entries after all entries in the set of entries with which the write pointer 510C is associated are written. For instance, the write pointer 510C may be updated from the first entry in the subset of entries 514-2 to the first entry in the subset of entries 514-3 (not shown) after current telemetry data is written to all entries in the subset of entries 514-2. The telemetry memory bridge 116 is configured to advance the write pointer 510C in some embodiments.

As a result of reading the telemetry data in the last entry in the third buffer 500C (e.g., entry for Tile N current of Epoch K), the position of the read pointer 508C is moved back to the first entry in the third buffer 500C (e.g., entry for Tile 1 of first epoch). As a result of writing telemetry data to the last remaining empty entry in the subset of current telemetry entries 514-M, the position of the write pointer 510C is moved back to the subset of current telemetry entries 514-1 in the third buffer 500C (e.g., entry for Tile 1 of First epoch).

The telemetry processing engine 110 is configured to detect various buffer error conditions associated with the third buffer 500C. The telemetry memory bridge 116 may detect a buffer overrun condition in response to a determination that advancing the write pointer 510C would position the write pointer 510C at the same set of entries as the read pointer 508C. Detection of the overrun condition, for instance, may include an attempt by the telemetry memory bridge 116 to write an entry to a same set of telemetry data entries 506 to which the read pointer 508C is pointing. As a result of detecting the buffer overrun condition, the telemetry memory bridge 116 may generate an interrupt, which is provided to or otherwise detected by the system control processor 120 and/or the management control processor 122. In response to registering the buffer overrun condition, in some implementations, the management control processor 122 may reset a position of the read pointer 508C and/or a position of the write pointer 510C to an initial position of the first buffer 500C. In connection with the buffer overrun condition, the system control processor 120 may adjust operation of one or more tile sensor controllers 202, such as by reinitializing the controllers and/or the sensors to sample the current telemetry data at a different rate.

In some embodiments, the telemetry memory bridge 116 generates a timestamp 511C or other time information indicating a time at which a first entry or entries among a subset of current telemetry entries 514 is received. It is noted that the subset of current telemetry entries 514 for a given epoch are not necessarily received in consecutive order or at once. The telemetry memory bridge 116 includes the timestamp 511C in the second entries 504C of the third buffer 500C in the telemetry control memory 118. For instance, a first timestamp may be included in the subset of current telemetry entries 514-1 for the first epoch, a second timestamp may be included in the subset of current telemetry entries 514-2 for the second epoch, and so on. In some embodiments the timestamp 511C may be included as its own entry in the second entries 504C.

As described with respect to FIG. 3, a current controller may be associated with or included in each core 302. In some embodiments, each current controller may generate a timestamp for individual current measurements. Each individual current telemetry data may include or have associated therewith a timestamp indicating a time at which the current measurement was obtained. For instance, the current telemetry data for the first core in the subset of current telemetry entries 514-1 may have a first timestamp, the current telemetry data for the second core in the subset of current telemetry entries 514-1 may have a second timestamp, the current telemetry data for the Nth core in the subset of current telemetry entries 514-1 may have an Nth timestamp.

In some embodiments, the current telemetry data may include an address or identifier associated with the tile or mesh node for which the current telemetry data was generated. The telemetry memory bridge 116 compares the address with addresses of the tiles 0, 1, ... N and, based on a match between the addresses, stores the current telemetry data in the third buffer 500C. For the subset of current telemetry entries 514-1, the telemetry memory bridge 116 may receive telemetry data 114-1 including current telemetry data associated with Core 1 of the mesh node 102-2 (see FIGS. 1 and 3). Based on an address or identifier in the telemetry data 114-1, the telemetry memory bridge 116 writes the current telemetry data to the Core 1 Current location in the third buffer 500C for the subset of current telemetry entries 514-1.

FIG. 6A illustrates a set of status registers 600A for tracking telemetry data received by the telemetry memory bridge 116 for a plurality of epochs according to one or more embodiments. The telemetry memory bridge 116 of the SoC architecture 100 stores and maintains set of status registers for tracking the telemetry data received by the telemetry memory bridge 116. The status registers 600A are represented as a table having rows and columns; however, this is provided for ease of description and the status registers 600A may be implemented as one or more arrays, data structures, or data objects in various embodiments.

The status registers 600A include a set of entries 602-1 for a tile corresponding to a first mesh node of the SoC architecture 100, a set of entries 602-2 for a tile corresponding to a second mesh node of the SoC architecture 100, a set of entries 602-3 for a tile corresponding to a third mesh node of the SoC architecture 100, up to a set of entries 602-N corresponding to an Nth mesh node of the SoC architecture 100. With specific reference to the SoC architecture 100 shown in FIG. 1, for instance, the Nth mesh node would be the ninth mesh node 102-9.

The status registers 600A also include a set of statuses for types of telemetry data obtained for a first epoch and a set of statuses for types of telemetry data obtained for a second epoch. The set of statuses include tile temperature statuses 604-A for a first epoch, tile temperature statuses 604-B for a second epoch, tile voltage statuses 606-A for the first epoch, tile voltage statuses 606-B for the second epoch, tile current statuses 608-A of a first processor core (e.g., processor core 302-1 in FIG. 3) for the first epoch, tile current statuses 608-B of the first processor core for the second epoch, tile current statuses 610-A of a second processor core (e.g., processor core 302-2 in FIG. 3) for the first epoch, and tile current statuses 610-B of the second processor core for the second epoch.

Each of the status registers stores a bit indicating whether telemetry data of the type specified is stored and not yet read and the write pointer has not been advanced. In operation, the telemetry memory bridge 116 updates the value of the bit in response to receiving all the telemetry data corresponding to the telemetry type for the given epoch. For instance, the tile temperature statuses 604-A, the tile voltage statuses 606-A, the tile current statuses 608-A, and the tile current statuses 610-A correspond to statuses of telemetry data for a first epoch whereas the tile temperature statuses 604-B, the tile voltage statuses 606-B, the tile current statuses 608-B, and the tile current statuses 610-B correspond to statuses of telemetry data for a second epoch.

As a result of storing telemetry data in one of the circular buffers 500, the telemetry memory bridge 116 updates a corresponding bit in the status register. For instance, as a result of receiving and storing temperature telemetry data for the mesh node 102-1 in the subset of temperature telemetry entries 506-1 of the first buffer 500A, the telemetry memory bridge 116 may update the tile temperature status 604-A bit TA_1 from binary zero (0) to binary one (1). As a result of detecting that all of the status bits for the tile temperature status 604-A for the first epoch are set to binary one (1), the telemetry memory bridge 116 may clear the status registers for the tile temperature status 604-A (e.g., by updating the tile temperature status 604-A bit TA_1 from binary one (1) back to zero (0)) and advance the write pointer 510A from the current set of entries to the next subset of temperature telemetry entries 506. The same principle applies to the other status bits 606, 608, and 610 in the status register 600A.

The telemetry memory bridge 116 may advance a write pointer 510 (see FIGS. 5A through 5C) of a given buffer 500 to a next subset of entries as a result of a determination that telemetry data has been received and written to every entry in the current subset of entries. The telemetry memory bridge 116 updates the status register for each telemetry type and for a given epoch as a result of receiving telemetry data of the specified type. The telemetry memory bridge 116, for instance, may receive temperature telemetry data associated with tile 1 and update the status TA_1 from a binary value of zero (0) to one (1) as a result. In response to receiving temperature telemetry data for every tile in a given epoch and updating the status bits 604-A to a binary value of one (1), the telemetry memory bridge 116 resets the values of the status bits 604-A to binary zero (0) and increments the write pointer 510A from the current subset of entries (e.g., subset 506-2) to the next subset of entries (e.g., subset 506-3).

The telemetry memory bridge 116 may detect an overrun error condition in response to a determination that (i) one or more of status bits of a telemetry type for a first epoch (e.g., temperature status bits 604-A) are set to a first value indicating that telemetry data has yet to be received for one or more mesh nodes 102; and (ii) all of the status bits for the same telemetry type for a second epoch (e.g., temperature status bits 604-B) are set to a second value indicating that all telemetry data has been received for the mesh nodes. As a result of detecting the presence of the overrun error condition, the telemetry memory bridge 116 may generate an interrupt that is provided to or detectable by the system control processor 120 and/or the management control processor 122.

As a more particular example, the telemetry memory bridge 116 may detect the occurrence of an overrun error for Tile 1 as a result of detecting that (i) the temperature status bit TA_1 has a binary value of zero (0); and, at the same time (ii) all of the status registers 604-B have transitioned to a binary value of one (1). In response to detection of the overrun error, the telemetry memory bridge 116 may generate an interrupt that causes the system control processor 120 and/or the management control processor 122 to perform one or more remediation actions. Such remediation actions may include sending the message 126 causing the tile sensor controller 202 for the mesh node 102-1 to modify operation of the temperature sensor hub 212 or resetting the read pointer 508. Operational modification of the temperature sensor hub 212 may include reducing a sample rate of temperature measurements or reinitializing the temperature sensor hub 212. This principle also applies to the tile voltage statuses 606-A and 606-B as well as the tile current statuses 608 and 610.

A plurality of pointers 611 are associated with the status register 600A. A pointer may be provided for each type of telemetry data and each type of telemetry data includes a pair of status bits. For instance, for the first tile 602-1 (corresponding to the mesh node 102-1), there is a pointer 611 and two temperature status bits TA_1 and TA_2. The temperature status bit TA_1 initially has a binary value of zero (0). The pointer 611 points to the temperature status bit TA_1 at the start of a first epoch. The start of an epoch corresponds, in some embodiments, to a time at which time information (e.g., timestamp 611A, timestamp 511A) is generated and stored in a circular buffer, as described with respect to FIGS. 5A, 5B, and 5C. Those of skill in the art will appreciate that various factors (e.g., location of a mesh node relative to designated mesh node 102-9, data traffic on the mesh network) affect the timing and/or order in which telemetry data arrives at the telemetry processing engine 110. Accordingly, the beginning or end of an epoch may be marked by different types of telemetry data or by telemetry from different mesh nodes. Each of the plurality of pointers 611 correspond to a memory location storing an address of one of the status register bits in the status register 600A.

After the start of the first epoch, temperature telemetry data of the mesh node 102-1 is received and stored in Tile 1 Temperature location in the set of temperature telemetry entries 506-1 of the first circular buffer 500A. In connection with storing the temperature telemetry data in the set of temperature telemetry entries 506-1, the telemetry memory bridge 116 updates the value of the temperature status bit TA_1 (to which the pointer 611 is pointing) from zero (0) to one (1). The telemetry memory bridge 116 may also advance the write pointer 510A to the next subset of temperature telemetry data entries 506 (e.g., advancing the write pointer 510A from timestamp in the subset 506-1 to the subset 506-2).

During the first epoch, the telemetry memory bridge 116 detects that all of the entries in the set of temperature telemetry entries 506-1 are filled in connection with a determination that all of the tile temperature statuses 604-A have a value of one (1). In response to determining that the set of temperature telemetry entries 506-1 are filled with telemetry data, the telemetry memory bridge 116 resets the value of each of the tile temperature statuses 604-A to zero (0).

For the second epoch successive to the first epoch, the telemetry memory bridge 116 adjusts the pointer 611 to point at the status bit TB_1. In the second epoch, the temperature telemetry data of the mesh node 102-1 is received and stored in Tile 1 Temperature location in the set of temperature telemetry entries 506-2 of the first circular buffer 500A. In connection with storing the temperature telemetry data in the set of temperature telemetry entries 506-2, the telemetry memory bridge 116 updates the value of the temperature status bit TB_1 (to which the pointer 611 is pointing) from zero (0) to one (1). The temperature memory bridge 116 also adjusts the pointer 611 to point back to the status bit TA_1.

During the second epoch, the telemetry memory bridge 116 detects that all of the entries in the set of temperature telemetry entries 506-2 are filled in connection with a determination that all of the tile temperature statuses 604-B have a value of one (1). In response to determining that the set of temperature telemetry entries 506-2 are filled with telemetry data, the telemetry memory bridge 116 resets the value of each of the tile temperature statuses 604-B to zero (0).

FIG. 6B illustrates an example set of mask registers 600B for tracking an telemetry activation status of the mesh nodes 102 or whether telemetry data collection is activated for a particular telemetry type. The telemetry memory bridge 116 may utilize the mask registers 600B in connection with tracking the telemetry data statuses using the status registers 600A or in connection with determining whether to issue a message 126 to modify operation of telemetry data collection, as described elsewhere herein. The mask registers 600B are represented as a table having rows and columns; however, this is provided for ease of description and the mask registers 600B may be implemented as one or more arrays, data structures, or data objects in various embodiments.

The mask registers 600B include a set of mask entries 612-1 for a tile corresponding to a first mesh node of the SoC architecture 100, a set of mask entries 612-2 for a tile corresponding to a second mesh node of the SoC architecture 100, a set of mask entries 612-3 for a tile corresponding to a third mesh node of the SoC architecture 100, up to a set of mask entries 612-N corresponding to an Nth mesh node of the SoC architecture 100. With specific reference to the SoC architecture 100 shown in FIG. 1, for instance, the Nth mesh node would be the ninth mesh node 102-9.

The mask registers 600B also include a set of masks for all types of telemetry data. The set of masks include a tile temperature mask 614 for temperature telemetry, a tile voltage mask 616 for voltage telemetry, a tile current mask 618-1 for current telemetry of a first processor core (e.g., processor core 302-1 in FIG. 3), a tile current mask 618-2 for current telemetry of a second processor core (e.g., processor core 302-2 in FIG. 3).

In some embodiments, the telemetry memory bridge 116 implements the tile mask registers to determine whether to generate an interrupt. For instance, the telemetry memory bridge 116 may determine, based on the status registers 600A, that the tile voltage statuses 606-A and 606-B for the mesh node 102-3 indicate that voltage telemetry data was not received for a current epoch and a next epoch (e.g., entries VA_3 and VB_3 both have a zero value). Prior to generating an interrupt or an error message, however, the telemetry memory bridge 116 may reference a tile voltage mask status associated with the mesh node 102-3 and detect that the status mask VM_3 has a value (e.g., 1) indicating that the processor cores 106 associated with the mesh node 102-3 are inactive or deactivated for voltage telemetry processing. As a result, the telemetry memory bridge 116 does not generate an interrupt in the absence of voltage telemetry data for the current epoch and/or the next epoch.

In some embodiments, the telemetry memory bridge 116 may perform a set of logical operations involving one or more of the status mask registers 600B in connection with a determination of whether all telemetry data of a certain type was received for a given epoch. As a specific example, the tile voltage status mask VM_1 for the tile 300 associated with the mesh node 102-1 may have a value indicating that the processor cores 106 of the mesh node 102-1 are inactive for a given epoch or not subject to voltage telemetry data collection for a given epoch. The value of the status mask VM_1 in such a circumstance may be a binary value of one (1). The value of the tile voltage status register VA_1 may have a binary value of zero (0) for the same given epoch, indicating that voltage telemetry data was not received from the mesh node 102-1. The telemetry memory bridge 116 may perform a logical OR operation using the status mask VM_1 and the status register VA_1 to obtain a binary value result of one (1). In some embodiments, the voltage status register VA_1 may be updated based on the status mask VM 1. The telemetry memory bridge 116, as a result of the status mask, therefore, may not generate an interrupt in the absence of voltage telemetry data from the mesh node 102-1 for a given epoch.

Figure 7:
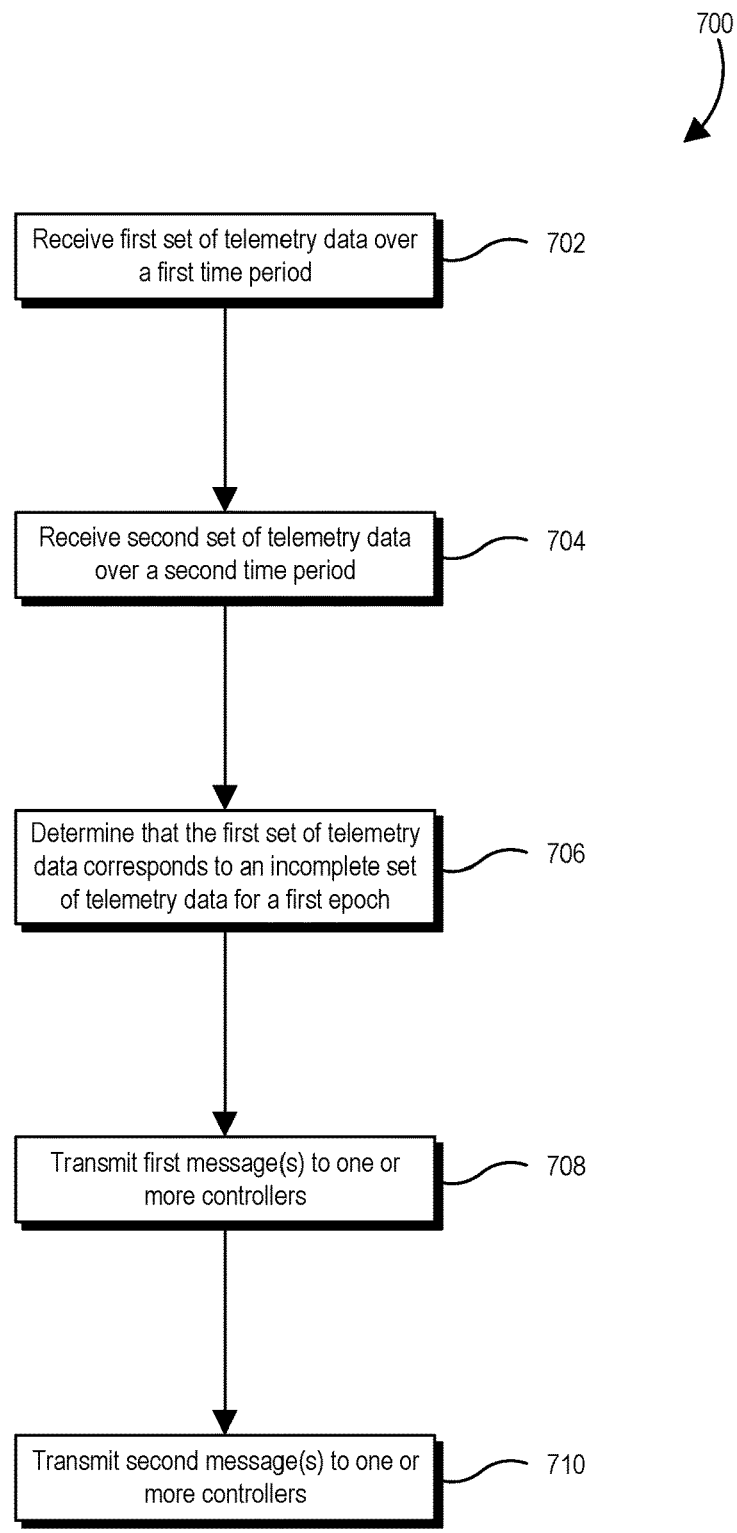
FIG. 7 illustrates a method for synchronizing telemetry aggregation and buffering in the SoC architecture of FIG. 1 according to one or more embodiments.

FIG. 7 illustrates a method 700 for synchronizing telemetry aggregation and buffering in the SoC architecture of FIG. 1 according to one or more embodiments. The method 700 may be performed by one or more entities described herein, such as the telemetry memory bridge 116, the system control processor 120, and/or the management control processor 122. Certain features described with respect to FIG. 7 are discussed in greater detail elsewhere herein so further description thereof is omitted for brevity.

The method 700 includes receiving, at 702, a first set of telemetry data associated with operation of a plurality of processor cores of an SoC. The first set of telemetry data may be transmitted by a mesh network router of a plurality of mesh network routers that are each associated with one of the mesh nodes 102, as described with respect to FIGS. 2, 3, and elsewhere herein. The first set of telemetry data may include data generated by a plurality of tile sensor controllers (e.g., tile sensor controllers 204, 206, 306) corresponding to a subset of the mesh nodes 102. The first set of telemetry data may correspond, by way of non-limiting example, to the telemetry data 114-8, 114-5, or 114-7 of FIG. 1.

The method 700 also includes receiving, at 704, a second set of telemetry data associated with operation of a plurality of processor cores of an SoC. The second set of telemetry data may be transmitted by a mesh network router of a plurality of mesh network routers that are each associated with one of the mesh nodes 102, as described with respect to FIGS. 2, 3, and elsewhere herein. The second set of telemetry data may include data generated by a plurality of tile sensor controllers (e.g., tile sensor controllers 204, 206, 306) corresponding to a subset of the mesh nodes 102. The second set of telemetry data may correspond, by way of non-limiting example, to the telemetry data 114-6, 114-3, or 114-2 of FIG. 1.

The method 700 further includes determining, at 706, that, during the second time period, the first set of telemetry data corresponds to an incomplete set of telemetry data for a first epoch for telemetry data collection that includes the first time period. The telemetry memory bridge 116 may detect a set of conditions that are correlated with an incomplete set of telemetry data. An incomplete set of data is, more particularly, a set of data that does not include all the telemetry data entries of a single subset of the telemetry data entries shown in FIGS. 5A, 5B, and 5C. For example, an incomplete set may be a set of temperature telemetry data that does not include all the first subset of temperature entries 506-1. An incomplete set may be a set of voltage telemetry data that does not include all the first subset of voltage telemetry entries 512-1. An incomplete set may be a set of current telemetry data that does not include all the first subset of current telemetry entries 514-1. Further description regarding 706 is provided with respect to FIG. 8 infra.

The method 700 includes transmitting, at 708, a first set of messages to one or more controllers of the plurality of processor cores to modify operations associated with telemetry data collection. The message(s) transmitted in 708 corresponds to the message 126 sent to one or more tile sensor controllers 108 of the SoC architecture 100. The message(s) transmitted in 708, in some embodiments, include the message 236 sent to the VT telemetry controller 204 and/or the message 238 sent to the current telemetry controller 206. In some embodiments, the first set of messages transmitted in 708 include the message 242 causing the sensor trigger 240 to discontinue telemetry data collection by the VT controller 204 and/or the current controller 206 (e.g., as a result of issuing message 244 and/or message 246). The message(s) sent in 708 may cause the tile temperature controllers 108, the VT telemetry controller 204, and/or the current telemetry controller 206 receiving the message to perform one or more remediation actions. The remediation actions performed may include resetting or synchronizing one or more devices to align the measurements in a future epoch. The tile temperature controllers 108, the VT telemetry controller 204, and/or the current telemetry controller 206 that receive the message may initiate telemetry data collection based on a same event, such as a ready signal or handshake issued over the utility bus or the channels 104.

The method 700 may include transmitting, at 710, a second set of messages to one or more controllers of the plurality of processor cores to modify operations associated with telemetry data collection. The message(s) transmitted in 710 corresponds to the message 126 sent to one or more tile sensor controllers 108 of the SoC architecture 100. The second set of messages cause the one or more tile controllers 108 receiving the second set of messages to restart or reinitialize telemetry data collection. In some embodiments, the second set of messages transmitted in 710 may include the message 242 causing the sensor trigger 240 to issue instructions to the VT controller 204 and/or the current controller 206 to instruct the VT controller 204 and/or the current controller 206 to restart telemetry data collection. In some embodiments, the second set of messages may be transmitted in 710 as a result of detecting that telemetry data collection is successfully discontinued in response to the first set of messages transmitted in 708. In some embodiments, instead of transmitting the second set of messages, one or more of the tile sensor controllers 108 may detect that the telemetry data collection has been discontinued and may restart telemetry data collection in response.

Figure 8:
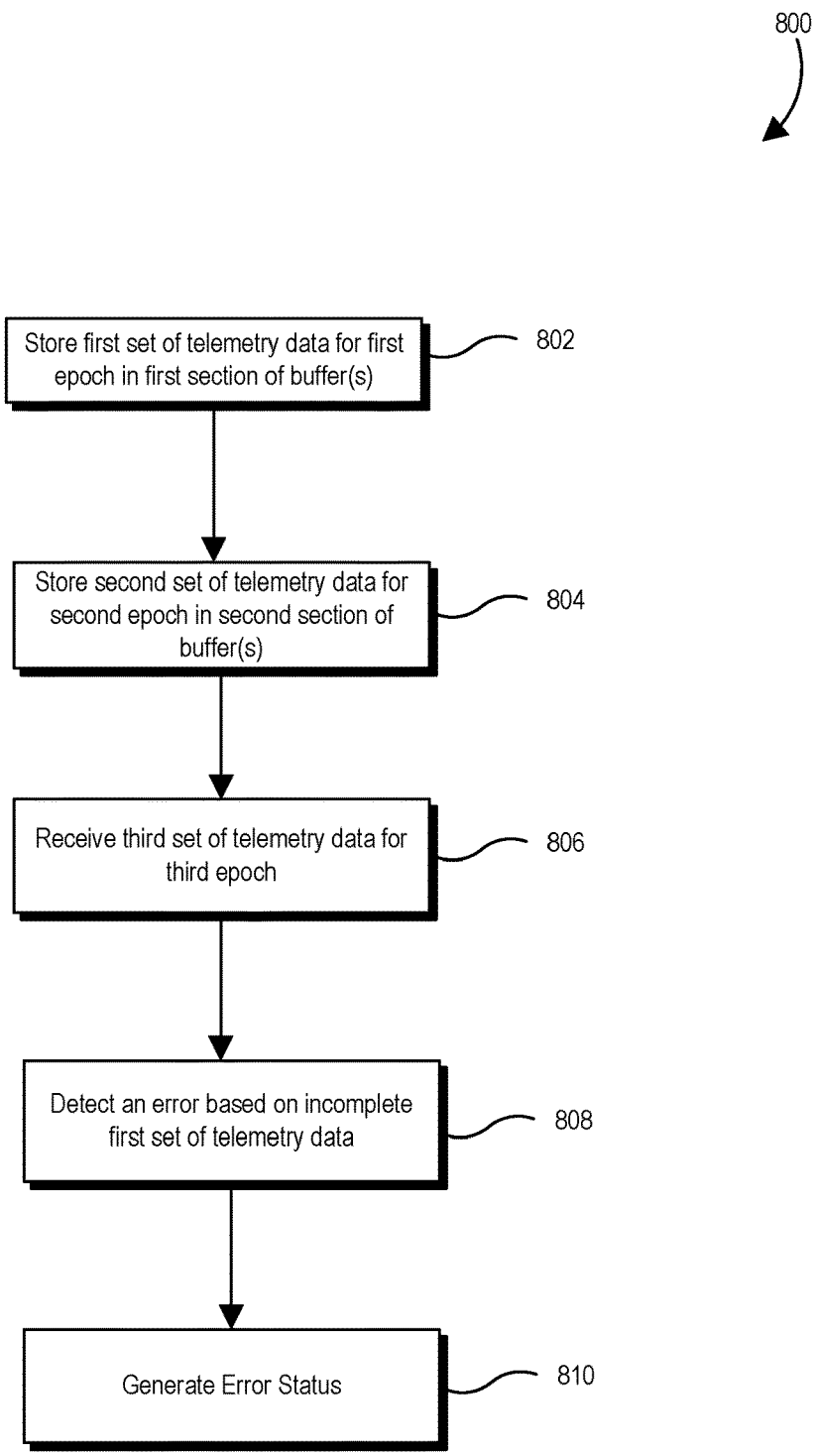
FIG. 8 illustrates a method for determining an error status associated with collecting telemetry data according to one or more embodiments.

Determining, in 706, may involve utilization of the status register 600A and/or the mask register 600B. FIG. 8 shows a method 800 for determining an error status associated with collecting telemetry data according to one or more embodiments. The method 800 may be performed by one or more entities described herein, such as the telemetry memory bridge 116, the system control processor 120, and/or the management control processor 122. All or some of the method 800 may be performed in connection with determining, at 706, that, during the second time period, the first set of telemetry data corresponds to an incomplete set of telemetry data for a first epoch for telemetry data collection that includes the first time period. The start of an epoch corresponds, in some embodiments, to a time at which time information (e.g., timestamp 511A, timestamp 513A) is generated and stored in a circular buffer, as described with respect to FIGS. 5A, 5B, and 5C.

The method 800 includes storing, at 802, the first set of telemetry data for a first epoch in a first section of a circular buffer. For instance, the telemetry memory bridge 116 may store the first set of telemetry data received in 702 over a first time period in the telemetry control memory 118. In some embodiments, the first set of telemetry data may include different types of telemetry data, such as temperature telemetry data, voltage telemetry data, current telemetry data, and/or state telemetry data. The first set of telemetry data stored in 802 is an incomplete set of data. For instance, the first set of telemetry data may not include a telemetry data entry for every memory location in the subset of temperature telemetry entries 506-1.

As a result of not storing a complete set of telemetry data in 802, one or more associated status bits in the status register 600A may have a value of binary zero (0). Continuing with the previous example, the telemetry memory bridge 116 may not receive temperature telemetry data for the Tile 1 Temperature during the first epoch. Therefore, the subset of temperature telemetry entries 506-1 is incomplete and the tile temperature status TA_1 has a value of binary zero (0).

Storing the first set of telemetry data in 802 may include storing different types of telemetry data in different circular buffers. The telemetry memory bridge 116 may store temperature telemetry data in the first circular buffer 500A, voltage telemetry data in the second circular buffer 500B, and current telemetry data in the third circular buffer 500C. Storing the first set of telemetry data in 802 may include storing telemetry data associated with a given mesh node 102 in a particular section of a circular buffer. For instance, telemetry data associated with the mesh node 102-2 may be stored in a Tile 2 Temperature location of the subset of temperature telemetry entries 506-1 shown in FIG. 5A, which corresponds to one or more memory addresses in the telemetry control memory 118.

The method 800 further includes storing, at 804, the second set of telemetry data for a second epoch in a second section of a circular buffer. In some instances, the second set of telemetry data stored in 804 may be an incomplete set of data. By way of example, the second set of telemetry data may not include a telemetry data entry for every memory location in the subset of temperature telemetry entries 506-2. The second set of telemetry stored in 804 may correspond to the second set of telemetry data received over a second time period different than the second time period in 702 and may be stored in the telemetry control memory 118. The telemetry memory bridge 116 may update the pointer(s) 511 to point to the next status bit in the status register 600A, as described with respect to FIG. 6A.

In some embodiments, the second set of telemetry data may also include different types of telemetry data, such as temperature telemetry data, voltage telemetry data, current telemetry data, and/or state telemetry data. Storing the second set of telemetry data in 804 may include storing different types of telemetry data in different circular buffers. The telemetry memory bridge 116 may store temperature telemetry data in the first circular buffer 500A, voltage telemetry data in the second circular buffer 500B, and current telemetry data in the third circular buffer 500C. Storing the second set of telemetry data in 804 may include storing telemetry data associated with a given mesh node 102 in a particular section of a circular buffer. For instance, telemetry data associated with the mesh node 102-2 may be stored in a Tile 2 Temperature location of the subset of temperature telemetry entries 506-2 shown in FIG. 5A.

The method 800 may also include receiving, at 806, a third set of telemetry data for a third epoch. Continuing with the non-limiting example in 804, the telemetry memory bridge 116 may receive temperature telemetry data at a third time after which the first telemetry data for the second epoch was received. The telemetry memory bridge 116 may receive temperature telemetry data associated with a third timestamp subsequent to the second timestamp of the subset of temperature telemetry entries 506-2+.

The method 800 may include detecting, at 808, an error based on a determination that the first set of telemetry data is an incomplete set of data. The error detected in 808 may correspond to a first error condition in which, at a time when the third set of telemetry data was received in 806, the first set of telemetry data is an incomplete set of data. The telemetry memory bridge 116 may determine that, at a time when the third set of telemetry data was received in 806, the tile status bits for the particular type of telemetry data in the first epoch include one or more binary values of zero (0) and one or more binary values of one (1).

As an example, at the third time, the tile temperature status bits 604-A in the status register 600A may include one or more status bits of zero (0). At the third time, the tile temperature status bits 604-B may have a value of zero (0) as a result of the telemetry memory bridge 116 determining that the second set of telemetry data received in 804 is a complete set of telemetry data and resetting the values of one (1) to zero (0). Detecting the error in 808 corresponds to a condition in which the write pointer 510 is pointing to a subset of telemetry data two epochs behind the third set of telemetry data received in 806. In such a condition, the missing data from the first set of telemetry data received in 702 may be lost or the sampling rate may be set too high for the type of telemetry data.

In some instances, detection of the error in 808 may be specific to a status bit. For example, the tile temperature status bit TA_1 may be set to zero (0) indicating that the temperature telemetry data for the first tile 602-1 has not been received for the first epoch. At the third time, the telemetry memory bridge 116 may receive temperature telemetry data for the first tile 602-1 that is associated with a third timestamp subsequent to the second timestamp associated with the second set of data received in 704 of the method 700. The telemetry memory bridge 116 may reference the temperature status bit TA_1 for the tile 602-1 still has a value of zero (0), indicating that the telemetry memory bridge 116 is still waiting for the temperature telemetry data for the tile 602-1 for the first epoch. Therefore, the telemetry memory bridge 116 may detect a first error condition based on the zero (0) value of the temperature status bit TA_1.

The error detected in 808 may correspond to a second error condition in which the telemetry memory bridge 116 determines that, at a time when telemetry data is received in 806 for a third epoch, the first set of telemetry data stored in 802 is still an incomplete set of telemetry data. During or at an end of the second epoch, for example, the telemetry memory bridge 116 may determine that all the tile temperature status bits 604-B have a binary value of one (1), indicating that the second set of temperature telemetry data for the second epoch is complete. In response, the telemetry memory bridge 116 adjusts the values of the tile temperature status bits 604-B to zero (0). Referencing the tile temperature status bits 604-A, the telemetry memory bridge 116 determines that the tile temperature status bits 604-A includes one or more status bits having a value of zero (0), indicating that the first set of telemetry data stored in 802 is still incomplete. In response to receiving temperature telemetry data for a third epoch while the tile temperature status bits 604-A include one or more binary zero (0) values, the telemetry memory bridge 116 detects the presence of the second error condition based on a determination that the first set of tile temperature status bits 604-A are incomplete at a time when a third set of temperature telemetry data is received.

In response to detecting the error in 808, the method 800 includes generating, at 810, an error status. Generating an error status (e.g., the error status 125_ in 810 may include transmitting, by the telemetry memory bridge 116, a message to the system control processor 120 and/or the management control processor 122 indicating the error. Generating an error status in 810 may include updating a status bit monitored by the system control processor 120 and/or the management control processor 122 to a different value in some embodiment. Generating an error status in 810 may include generating an interrupt that is detected by the system control processor 120 and/or the management control processor 122. Generating the error status in 810 may cause the telemetry processing engine 110 to transmit one or more messages 126, as described herein. Generating the error message in 810 may include resetting a position of a read pointer and a write pointer associated with the circular buffer as a result of determining that the first set of telemetry data corresponds to an incomplete set.

In connection with or in response to generating the error status in 810, the telemetry processing engine 110 may reinitialize telemetry data collection, reset the read and write pointers of the buffers 500, and reinitialize communication with the management control processor 122. The telemetry processing engine 110 may then reassert the sensor trigger 240 (e.g., via sending the message(s) 242) to restart telemetry data collection again.

Different remediation actions may be performed or instructed based on whether the error detected in 808 is a first error condition or a second error condition. For instance, as a result of detecting the first error condition, the message 126 sent by the system control processor 122 may cause the tile sensor controllers 108, 202 to adjust a sampling rate associated with one or more types of telemetry data. As another example, as a result of detecting the second error condition, the message 126 may cause the tile sensor controllers 108, 202 to synchronize telemetry data collection according to the signal trigger 240 and, in some embodiments, based on a defined signal event (e.g., signal edge). As a more particular example, the message 126 may cause the VT telemetry controller 204 to reinitialize the temperature sensor hub 212 and/or the temperature sensors 308 to begin capturing temperature telemetry data at a signal edge of a clock or a trigger signal.

Figure 9:
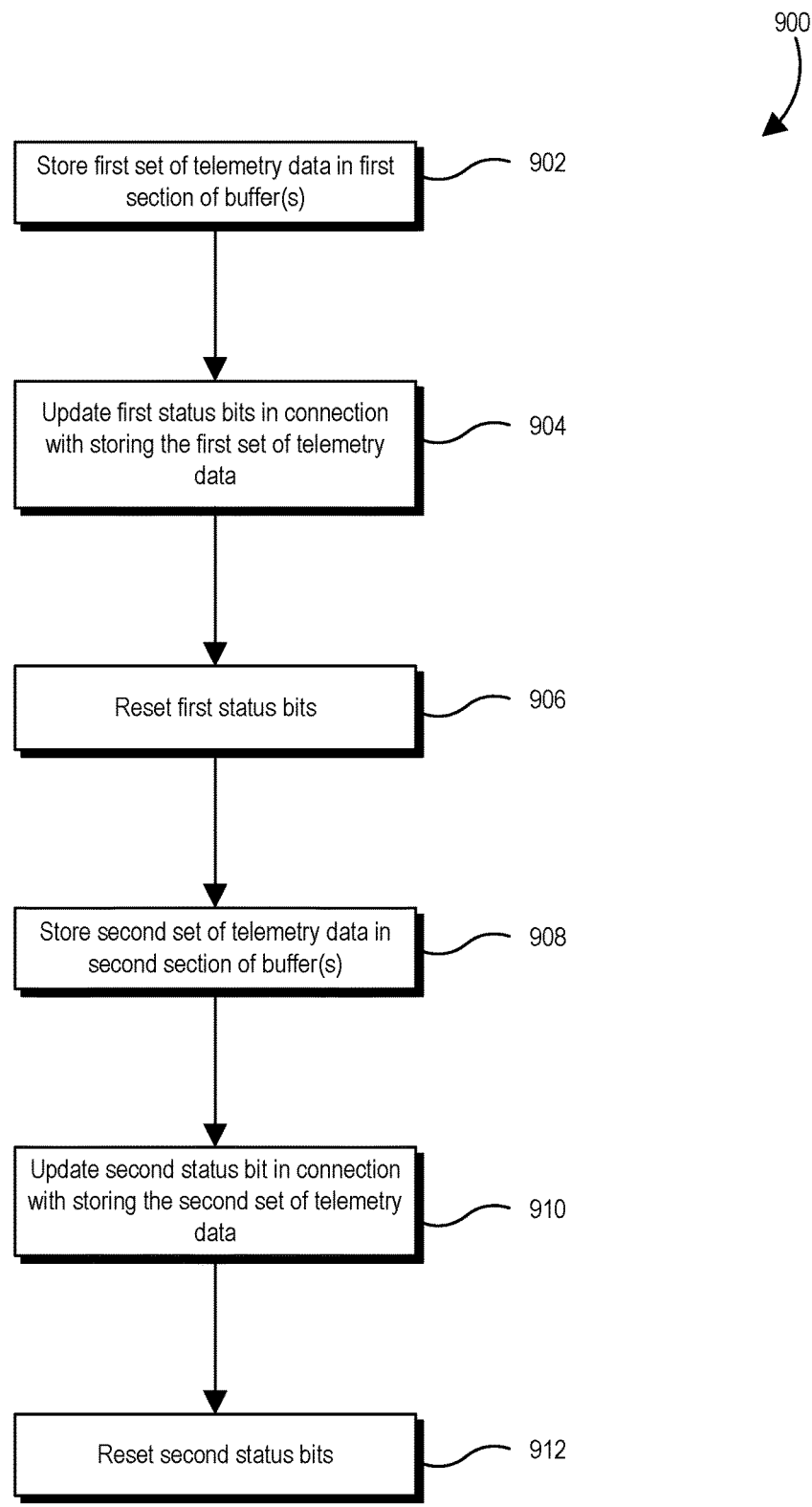
FIG. 9 illustrates a method for managing a status register in connection with receiving telemetry data for successive epochs according to one or more embodiments

FIG. 9 shows a method 900 for managing a status register in connection with receiving telemetry data for successive epochs according to one or more embodiments. The method 900 may be performed by one or more entities described herein, such as the telemetry memory bridge 116, the system control processor 120, and/or the management control processor 122.

The method 900 includes storing, at 902, the first set of telemetry data in a first section of a circular buffer. For instance, the telemetry memory bridge 116 may store the first set of telemetry data received in 702 in the telemetry control memory 118. In some embodiments, the first set of telemetry data may include different types of telemetry data, such as temperature telemetry data, voltage telemetry data, current telemetry data, and/or state telemetry data. Storing the first set of telemetry data in 902 may include storing different types of telemetry data in different circular buffers. The telemetry memory bridge 116 may store temperature telemetry data in the first circular buffer 500A, voltage telemetry data in the second circular buffer 500B, and current telemetry data in the third circular buffer 500C. Storing the first set of telemetry data in 902 may include storing telemetry data associated with a given mesh node 102 in a particular section of a circular buffer. For instance, telemetry data associated with the mesh node 102-2 may be stored in a Tile 2 Temperature location of the subset of temperature telemetry entries 506-1 shown in FIG. 5A, which corresponds to one or more memory addresses in the telemetry control memory 118.

The method 900 also includes updating, at 904, a first status bit in a status register in connection with storing the first set of telemetry data in the first section in 902. Continuing with the non-limiting example in 902, in connection with storing the telemetry data in the Tile 2 Temperature location of the subset of temperature telemetry entries 506-1, the telemetry memory bridge 116 may update the tile temperature status TA_2 for tile 602-2 from a binary value of zero (0) to a binary value of one (1).

In some implementations, the processor cores 106 associated with one or more of the mesh nodes 102 may be disabled or be operated without sending telemetry data. At the start of an epoch, the telemetry memory bridge 116 may perform a set of logic operations to obtain a result used to determine whether an error condition is present. For example, the telemetry memory bridge 116 may perform a set of logical operation using, as operands, a value of a status mask bit in the status mask register 600B and a value of a corresponding status bit in the status register 600A. As a more particular non-limiting example, for determining a result associated with the tile voltage status VA_1 of the tile 602-1, the telemetry memory bridge 116 may perform a logic OR operation using, as operands, (i) a value of the voltage mask VM_1 of the first mask entries 612-1 for the first tile and (ii) a value of the status register VA_1. Obtaining a zero (0) value for the result would indicate that the voltage telemetry data is incomplete for the first tile 602-1 in the first epoch whereas obtaining a one (1) value for the result would indicate that the voltage telemetry data is complete or masked, as described with respect to FIG. 6B and elsewhere herein, for the first tile 602-1 in the first epoch.

In some embodiments, the telemetry memory bridge 116 may update a value of one or more status bits based on values of the associated mask register bits. For instance, at the beginning of an epoch, the telemetry memory bridge 116 may reference the mask register 600B and, for each mask bit in the mask register 600B, update a corresponding status bit in the status register 600A. For example, the mask bit TM_3 may be set to a binary value of one (1), indicating that the processor core(s) 106 associated with mesh node 102-3 are disabled or operating without sending telemetry data. Responsive to detecting the mask bit TM_3 has a value of binary one (1), the telemetry memory bridge 116 may update a value to which a pointer 611 associated with the tile temperature status bits 604 of the third tile 602-3 is pointing. The telemetry memory bridge 116, more particularly, may update the value of the status bit TA_3 from a binary value of zero (0) to a binary value of one (1). As a result of the foregoing operations, an error status may not be generated when processor core(s) 106 are disabled or operating without sending telemetry data.

In some implementations, the first set of telemetry data received over the first time period, as described with respect to 702, may be a complete set of data in which telemetry data is stored in every entry in the first subset of temperature entries 506-1. In such situations, all of the status bits for a given set of status registers for an epoch (e.g., tile temperature statuses 604-A) have a binary value of one (1). As a result of detecting that a given set of status registers have a value of one (1), the method 900 includes resetting, at 906, the values of the first status bits (e.g., tile temperature statuses 604-A) back to a binary value of zero (0).

The method 900 further includes storing, at 908, the second set of telemetry data in a second section of a circular buffer. For instance, the telemetry memory bridge 116 may store the second set of telemetry data received in 702 in the telemetry control memory 118. In some embodiments, the second set of telemetry data may include different types of telemetry data, such as temperature telemetry data, voltage telemetry data, current telemetry data, and/or state telemetry data. Storing the second set of telemetry data in 908 may include storing different types of telemetry data in different circular buffers. The telemetry memory bridge 116 may store temperature telemetry data in the first circular buffer 500A, voltage telemetry data in the second circular buffer 500B, and current telemetry data in the third circular buffer 500C. Storing the second set of telemetry data in 908 may include storing telemetry data associated with a given mesh node 102 in a particular section of a circular buffer. For instance, telemetry data associated with the mesh node 102-2 may be stored in a Tile 2 Temperature location of the subset of temperature telemetry entries 506-2 shown in FIG. 5A.

The method 900 also includes updating, at 910, a second status bit in the status register in connection with storing the first set of telemetry data in the first section in 908. Continuing with the non-limiting example in 908, in connection with storing the telemetry data in the Tile 2 Temperature location of the subset of temperature telemetry entries 506-2, the telemetry memory bridge 116 may update the tile temperature status TB_2 for tile 602-2 from a binary value of zero (0) to a binary value of one (1).

The second set of telemetry data received over the second time period may be a complete set of data in which telemetry data is stored in every entry in the second subset of temperature entries 506-2. As a result of detecting that a given set of status registers have a value of one (1), the method 900 includes resetting, at 912, the values of the second status bits (e.g., tile temperature statuses 604-B) back to a binary value of zero (0).

Example Computer System

Figure 10:
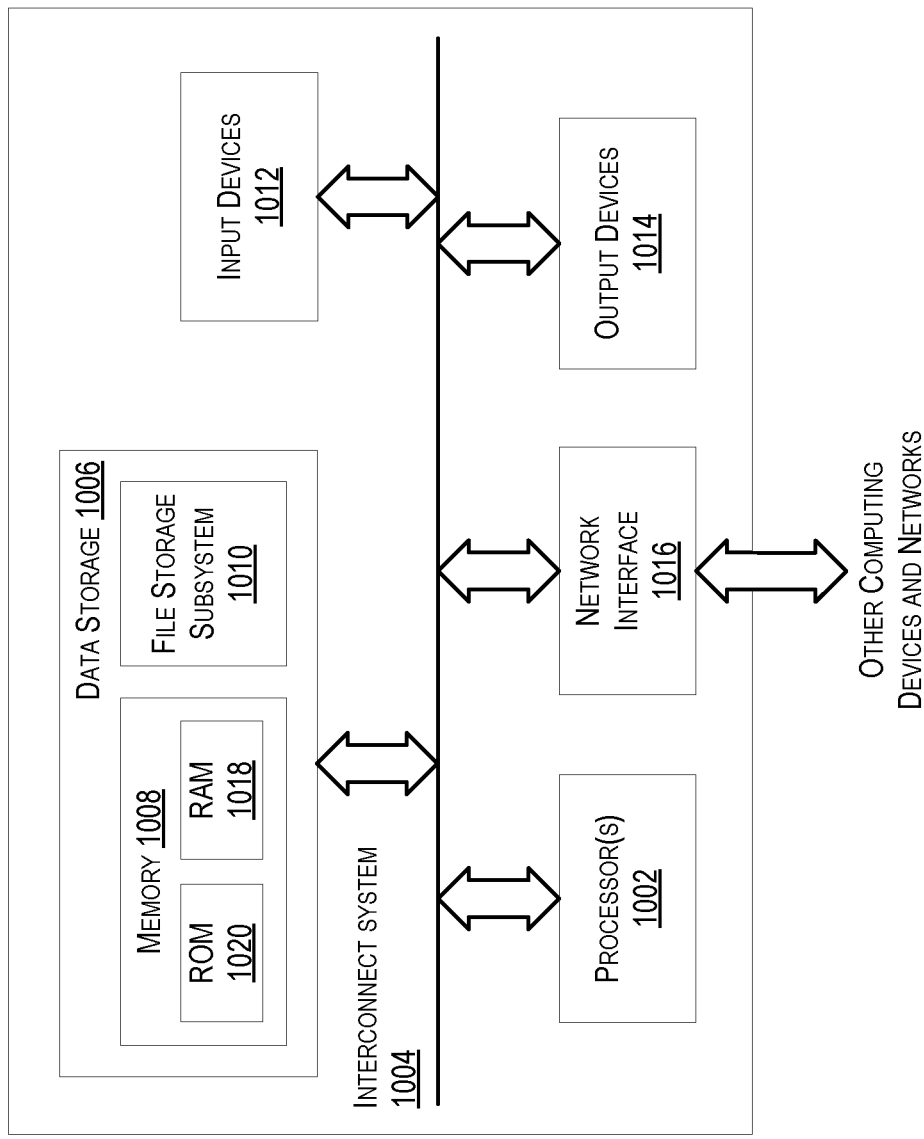
FIG. 10 illustrates a simplified block diagram of an example computer system according to one or more embodiments.

FIG. 10 depicts a simplified block diagram of an example computer system 1000 according to certain embodiments. Computer system 1000 can be used to implement any of the computing devices, systems, or servers described in the foregoing disclosure. As shown in FIG. 10, computer system 1000 includes one or more processors 1002 that communicate with a number of peripheral devices via an interconnect system 1004. These peripheral devices include a data storage 1006 (comprising a memory 1008 and a file storage subsystem 1100), user interface input devices 1012, user interface output devices 1014, and a network interface subsystem 1016.

Interconnect system 1004 can provide a mechanism for letting the various components and subsystems of computer system 1000 communicate with each other as intended. Although interconnect system 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Data storage 1006 includes a memory 1008 and a file/disk storage subsystem 1010. Subsystems 1018 and 1020 represent non-transitory computer-readable storage media that can store program code and/or data that provide the functionality of embodiments of the present disclosure.

Memory 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Further Embodiments

Embodiments disclosed herein may be combined with other embodiments disclosed herein to create additional embodiments. Embodiments disclosed herein include a method comprising receiving a first set of telemetry data associated with operation of a plurality of processor cores of a System-on-Chip (SoC) during a first epoch for telemetry data collection; receiving a second set of telemetry data associated with operation of the plurality of processor cores during a second epoch for telemetry data collection; determining that the first set of telemetry data corresponds to an incomplete set of telemetry data for the first epoch; and transmitting, as a result of determining that the first set of telemetry data corresponds to an incomplete set, a message to one or more controllers of the plurality of processor cores to modify operations associated with telemetry data collection.

In some embodiments, the defined condition is an epoch overlap condition in which the first epoch overlaps in part with a second epoch for telemetry data collection. In some embodiments, the message includes instructions for modifying a state of a trigger signal, and wherein collection of telemetry data for one or more processor cores of the plurality of processor cores is enabled or disabled based on the state.

In some embodiments, the method comprises receiving a third set of telemetry data associated with operation of the plurality of processor cores during a third epoch for telemetry data collection; and determining that one or more telemetry data instances for the first epoch are missing at a time when the third set of telemetry data was received.

In some embodiments, the method comprises storing the first set of telemetry data in a first section of a circular buffer; storing the second set of telemetry data in a second section of the circular buffer; updating a first status bit of a first plurality of status bits associated with the first epoch in a status register in connection with storing the first set of telemetry data in the first section; and updating a second status bit of a second plurality of status bits associated with the second epoch in the status register in connection with storing the second set of telemetry data in the second section, wherein determining that the first set of telemetry data corresponds to an incomplete set is in response to a transition of the second plurality of status bits to a defined state.

In some embodiments, the method comprises determining that the second set of telemetry data corresponds to a complete set of telemetry data for a second epoch for telemetry data collection, the second epoch different than the first epoch, wherein transmitting the message is in response to a determination that the second epoch is concluded before receiving a complete first set of telemetry data for the first epoch.

In some embodiments, the first set of telemetry data and the second set of telemetry data include a first type of telemetry data and a second type of telemetry data, and the method comprises updating a first bit of a status register and a second bit of the status register in response to receiving the first set of telemetry data, the first bit corresponding to the first type of telemetry data and the second bit corresponding to the second type of telemetry data; and updating a third bit of the status register and a fourth bit of the status register in response to receiving the second set of telemetry data, the third bit corresponding to the first type of telemetry data and the fourth bit corresponding to the second type of telemetry data.

Embodiments of the present disclosure include a system comprising memory; a telemetry memory bridge configured to receive a first set of telemetry data associated with operation of a plurality of processor cores of a System-on-Chip (SoC) during a first epoch for telemetry data collection; receive a second set of telemetry data associated with operation of the plurality of processor cores during a second for telemetry data collection; store the first set of telemetry data and the second set of telemetry data in the memory; determine that the first set of telemetry data corresponds to an incomplete set of telemetry data for the first epoch; and generate an error status as a result of a determination that the first set of telemetry data corresponds to an incomplete set of telemetry data. The system comprises one or more control processors configured to detect the error status; and transmit, as a result of the error status detected, transmit a message to one or more controllers of the plurality of processor cores to modify operations associated with telemetry data collection.

In some embodiments, the defined condition is an epoch overlap condition in which the first epoch overlaps in part with a second epoch for telemetry data collection.

In some embodiments, the telemetry memory bridge is configured to receive a third set of telemetry data associated with operation of the plurality of processor cores during a third epoch for telemetry data collection; and determine that one or more telemetry data instances for the first epoch are missing at a time when the third set of telemetry data was received.

In some embodiments, the telemetry memory bridge is configured to store the first set of telemetry data in a first section of a circular buffer; store the second set of telemetry data in a second section of the circular buffer; update a first status bit of a first plurality of status bits associated with the first epoch in a status register in connection with storing the first set of telemetry data in the first section; and update a second status bit of a second plurality of status bits associated with the second epoch in the status register in connection with storing the second set of telemetry data in the second section, wherein a determination that the first set of telemetry data corresponds to an incomplete set is in response to a transition of the second plurality of status bits to a defined state.

In some embodiments, the telemetry memory bridge is configured to determine that the second set of telemetry data corresponds to a complete set of telemetry data for a second epoch for telemetry data collection, the second epoch different than the first epoch, wherein transmitting the message is in response to a determination that the second epoch is concluded before the first epoch.

In some embodiments, the first set of telemetry data and the second set of telemetry data include a first type of telemetry data and a second type of telemetry data, and the telemetry memory bridge is configured to update a first bit of a status register and a second bit of the status register in response to receiving the first set of telemetry data, the first bit corresponding to the first type of telemetry data and the second bit corresponding to the second type of telemetry data; and update a third bit of the status register and a fourth bit of the status register in response to receiving the second set of telemetry data, the third bit corresponding to the first type of telemetry data and the fourth bit corresponding to the second type of telemetry data.

In some embodiments, the message includes instructions for modifying a state of a trigger signal, and wherein collection of telemetry data for one or more processor cores of the plurality of processor cores is enabled or disabled based on the state.

Embodiments of the present disclosure include a system-on-chip, comprising a plurality of processor cores; memory; a telemetry memory bridge coupled to the memory; a control processor communicatively coupled with the telemetry memory bridge; and a plurality of mesh network routers each configured to route telemetry data associated with one or more of the processor cores toward the telemetry memory bridge. The telemetry memory bridge is configured to receive a first set of telemetry data associated with operation of a plurality of processor cores of a System-on-Chip (SoC) during a first epoch for telemetry data collection, the first set of telemetry data transmitted by a mesh network router of the plurality of mesh network routers; receive a second set of telemetry data associated with operation of the plurality of processor cores during a second epoch for telemetry data collection, the second set of telemetry data transmitted by a mesh network router; store the first set of telemetry data and the second set of telemetry data in the memory; determine that the first set of telemetry data corresponds to an incomplete set of telemetry data for the first epoch; and generate an error status as a result of a determination that the first set of telemetry data corresponds to an incomplete set of telemetry data. The control processor is configured to detect the error status; and transmit a message to one or more controllers of the plurality of processor cores to modify operations associated with telemetry data collection.

In some embodiments, the telemetry memory bridge includes a status register having a first plurality of status bits associated with the first epoch and having a second plurality of status bits associated with the second epoch, and the telemetry memory bridge is configured to update a first status bit of the first plurality of status bits in response to receipt of the first set of telemetry data; and update the second status bit of the second plurality of status bits in response to receipt of the second set of telemetry data, wherein the control processor determines that the first set of telemetry data corresponds to an incomplete set is in response to a transition of the second plurality of status bits to a defined state.

In some embodiments, the telemetry memory bridge includes a mask register having a first mask bit associated with a first processor core of the plurality of processor cores and a second mask bit associated with a second processor core of the plurality of processor cores, and the telemetry memory bridge is configured to determine a first result associated with the first status bit based on a value of the first mask bit; and determine a second result associated with the second status bit based on a value of the second mask bit, wherein a determination that the first set of telemetry data corresponds to an incomplete set of telemetry data for the first epoch is based on the first result or the second result.

In some embodiments, the defined condition is an epoch overlap condition in which the first epoch overlaps in part with a second epoch for telemetry data collection.

In some embodiments, the telemetry memory bridge is configured to receive a third set of telemetry data associated with operation of the plurality of processor cores during a third epoch for telemetry data collection; and determine that one or more telemetry data instances for the first epoch are missing at a time when the third set of telemetry data was received.

In some embodiments, the telemetry memory bridge is configured to determine that the second set of telemetry data corresponds to a complete set of telemetry data for a second epoch for telemetry data collection, the second epoch different than the first epoch, wherein transmitting the message is in response to a determination that the second epoch is concluded before the first epoch.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method, comprising:
   receiving a first set of telemetry data associated with operation of a plurality of processor cores of a System-on-Chip (SoC) during a first epoch for telemetry data collection;
   receiving a second set of telemetry data associated with operation of the plurality of processor cores during a second epoch for telemetry data collection;
   wherein the first set of telemetry data and the second set of telemetry data include a first type of telemetry data and a second type of telemetry data, and wherein the method further comprising updating a first bit of a status register and a second bit of the status register in response to receiving the first set of telemetry data, the first bit corresponding to a first type of telemetry data and the second bit corresponding to a second type of telemetry data;
   determining that the first set of telemetry data corresponds to an incomplete set of telemetry data for the first epoch; and
   transmitting, as a result of determining that the first set of telemetry data corresponds to an incomplete set, a message to one or more controllers of the plurality of processor cores to modify operations associated with telemetry data collection.

2. The method of claim 1, wherein the defined condition is an epoch overlap condition in which the first epoch overlaps in part with a second epoch for telemetry data collection.

3. The method of claim 1, the method comprising:
   receiving a third set of telemetry data associated with operation of the plurality of processor cores during a third epoch for telemetry data collection; and
   determining that one or more telemetry data instances for the first epoch are missing at a time when the third set of telemetry data was received.

4. The method of claim 1, comprising:
   storing the first set of telemetry data in a first section of a circular buffer;
   storing the second set of telemetry data in a second section of the circular buffer;
   updating a first status bit of a first plurality of status bits associated with the first epoch in a status register in connection with storing the first set of telemetry data in the first section; and
   updating a second status bit of a second plurality of status bits associated with the second epoch in the status register in connection with storing the second set of telemetry data in the second section, wherein determining that the first set of telemetry data corresponds to an incomplete set is in response to a transition of the second plurality of status bits to a defined state.

5. The method of claim 1, comprising:
   determining that the second set of telemetry data corresponds to a complete set of telemetry data for a second epoch for telemetry data collection, the second epoch different than the first epoch, wherein transmitting the message is in response to a determination that the second epoch is concluded before receiving a complete first set of telemetry data for the first epoch.

6. The method of claim 1, further comprising:
   updating a third bit of the status register and a fourth bit of the status register in response to receiving the second set of telemetry data, the third bit corresponding to the first type of telemetry data and the fourth bit corresponding to the second type of telemetry data.

7. The method of claim 1, wherein the message includes instructions for modifying a state of a trigger signal, and wherein collection of telemetry data for one or more processor cores of the plurality of processor cores is enabled or disabled based on the state.

8. A system comprising:
   memory;
   a telemetry memory bridge configured to:
      receive a first set of telemetry data associated with operation of a plurality of processor cores of a System-on-Chip (SoC) during a first epoch for telemetry data collection;
      receive a second set of telemetry data associated with operation of the plurality of processor cores during a second epoch for telemetry data collection;
      store the first set of telemetry data and the second set of telemetry data in the memory;

determine that the first set of telemetry data corresponds to an incomplete set of telemetry data for the first epoch; and generate an error status as a result of a determination that the first set of telemetry data corresponds to an incomplete set of telemetry data; and one or more control processors configured to:

detect the error status; and transmit, as a result of the error status detected, a message to one or more controllers of the plurality of processor cores to modify operations associated with telemetry data collection.

9. The system of claim 8, wherein the defined condition is an epoch overlap condition in which the first epoch overlaps in part with a second epoch for telemetry data collection.

10. The system of claim 8, the telemetry memory bridge configured to:

receive a third set of telemetry data associated with operation of the plurality of processor cores during a third epoch for telemetry data collection; and determine that one or more telemetry data instances for the first epoch are missing at a time when the third set of telemetry data was received.

11. The system of claim 8, the telemetry memory bridge configured to:

store the first set of telemetry data in a first section of a circular buffer;

store the second set of telemetry data in a second section of the circular buffer;

update a first status bit of a first plurality of status bits associated with the first epoch in a status register in connection with storing the first set of telemetry data in the first section; and update a second status bit of a second plurality of status bits associated with the second epoch in the status register in connection with storing the second set of telemetry data in the second section, wherein a determination that the first set of telemetry data corresponds to an incomplete set is in response to a transition of the second plurality of status bits to a defined state.

12. The system of claim 8, the telemetry memory bridge configured to:

determine that the second set of telemetry data corresponds to a complete set of telemetry data for a second epoch for telemetry data collection, the second epoch different than the first epoch, wherein transmitting the message is in response to a determination that the second epoch is concluded before the first epoch.

13. The system of claim 8, wherein the first set of telemetry data and the second set of telemetry data include a first type of telemetry data and a second type of telemetry data, the telemetry memory bridge configured to:

update a first bit of a status register and a second bit of the status register in response to receiving the first set of telemetry data, the first bit corresponding to the first type of telemetry data and the second bit corresponding to the second type of telemetry data; and update a third bit of the status register and a fourth bit of the status register in response to receiving the second set of telemetry data, the third bit corresponding to the first type of telemetry data and the fourth bit corresponding to the second type of telemetry data.

14. The system of claim 8, wherein the message includes instructions for modifying a state of a trigger signal, and wherein collection of telemetry data for one or more processor cores of the plurality of processor cores is enabled or disabled based on the state.

15. A system-on-chip, comprising:

a plurality of processor cores;

memory;

a telemetry memory bridge coupled to the memory;

a control processor communicatively coupled with the telemetry memory bridge; and a plurality of mesh network routers each configured to route telemetry data associated with one or more of the processor cores toward the telemetry memory bridge, the telemetry memory bridge configured to:

receive a first set of telemetry data associated with operation of the plurality of processor cores during a first epoch for telemetry data collection, the first set of telemetry data transmitted by a mesh network router of the plurality of mesh network routers;

receive a second set of telemetry data associated with operation of the plurality of processor cores during a second epoch for telemetry data collection, the second set of telemetry data transmitted by a mesh network router;

store the first set of telemetry data and the second set of telemetry data in the memory;

determine that the first set of telemetry data corresponds to an incomplete set of telemetry data for the first epoch; and generate an error status as a result of a determination that the first set of telemetry data corresponds to an incomplete set of telemetry data, the control processor configured to:

detect the error status; and transmit a message to one or more controllers of the plurality of processor cores to modify operations associated with telemetry data collection.

16. The system-on-chip of claim 15, the telemetry memory bridge including a status register having a first plurality of status bits associated with the first epoch and having a second plurality of status bits associated with the second epoch, the telemetry memory bridge configured to:

update a first status bit of the first plurality of status bits in response to receipt of the first set of telemetry data; and update the second status bit of the second plurality of status bits in response to receipt of the second set of telemetry data, wherein the control processor determines that the first set of telemetry data corresponds to an incomplete set is in response to a transition of the second plurality of status bits to a defined state.

17. The system-on-chip of claim 15, the telemetry memory bridge including a mask register having a first mask bit associated with a first processor core of the plurality of processor cores and a second mask bit associated with a second processor core of the plurality of processor cores, the telemetry memory bridge configured to:

determine a first result associated with the first status bit based on a value of the first mask bit; and determine a second result associated with the second status bit based on a value of the second mask bit, wherein a determination that the first set of telemetry data corresponds to an incomplete set of telemetry data for the first epoch is based on the first result or the second result.

18. The system-on-chip of claim 15, wherein the defined condition is an epoch overlap condition in which the first epoch overlaps in part with a second epoch for telemetry data collection.

19. The system-on-chip of claim 15, the telemetry memory bridge configured to:
receive a third set of telemetry data associated with operation of the plurality of processor cores during a third epoch for telemetry data collection; and
determine that one or more telemetry data instances for the first epoch are missing at a time when the third set of telemetry data was received.

20. The system-on-chip of claim 15, the telemetry memory bridge configured to:
determine that the second set of telemetry data corresponds to a complete set of telemetry data for a second epoch for telemetry data collection, the second epoch different than the first epoch, wherein transmitting the message is in response to a determination that the second epoch is concluded before the first epoch.

\* \* \* \* \*